US010000160B2

(12) United States Patent
Aftanas et al.

(10) Patent No.: US 10,000,160 B2
(45) Date of Patent: Jun. 19, 2018

(54) VEHICLE ARTICLE CARRIER WITH INTEGRATED CAMERA AND SOLAR POWERED LIGHTING

(71) Applicant: JAC Products, Inc., Saline, MI (US)

(72) Inventors: Jeffrey M. Aftanas, Ortonville, MI (US); Gordon Michie, LaSalle (CA); Michael J. Presley, Plymouth, MI (US); Gerald J. Gomes, Macomb, MI (US)

(73) Assignee: JAC Products, Inc., Saline, MI (US)

( * ) Notice: Subject to any disclaimer, the term of this patent is extended or adjusted under 35 U.S.C. 154(b) by 0 days. days.

(21) Appl. No.: 15/357,535

(22) Filed: Nov. 21, 2016

(65) Prior Publication Data
US 2017/0066382 A1 Mar. 9, 2017

Related U.S. Application Data

(63) Continuation-in-part of application No. 13/678,040, filed on Nov. 15, 2012, now Pat. No. 9,527,435.
(Continued)

(51) Int. Cl.
B60R 9/04 (2006.01)
B60R 11/04 (2006.01)
B60Q 1/26 (2006.01)
B60Q 1/00 (2006.01)
F21S 9/03 (2006.01)
F21V 7/00 (2006.01)
H05B 37/02 (2006.01)
F21V 8/00 (2006.01)
(Continued)

(52) U.S. Cl.
CPC .............. *B60R 9/04* (2013.01); *B60Q 1/0023* (2013.01); *B60Q 1/2611* (2013.01); *B60Q 1/2661* (2013.01); *B60Q 1/2692* (2013.01); *B60R 9/058* (2013.01); *B60R 11/04* (2013.01); *F21S 9/03* (2013.01); *F21V 7/00* (2013.01); *G02B 6/0005* (2013.01); *H05B 37/0272* (2013.01); *B60K 2016/003* (2013.01); *F21Y 2115/10* (2016.08)

(58) Field of Classification Search
CPC . F21S 48/00; B60R 11/04; B60R 9/04; B60Q 1/2611; B60Q 1/2661; B60Q 1/26; B60Q 1/06; B60Q 1/085; B60Q 1/10; B60Q 1/12; B60Q 1/423; B60Q 1/245; B60Q 1/2607; B60Q 1/2619; B60Q 1/48–1/486
See application file for complete search history.

(56) References Cited

U.S. PATENT DOCUMENTS 4,426,028 A   1/1984 Bott
4,800,470 A   1/1989 Hartsaw
(Continued)

Primary Examiner — Joseph L Williams
Assistant Examiner — Jose M Diaz
(74) Attorney, Agent, or Firm — Harness, Dickey & Pierce, P.L.C.

(57) ABSTRACT

A vehicle article carrier system is disclosed for carrying articles above an outer body surface of a vehicle. The system may incorporate at least one support rail secured to the outer body surface. The support rail may have a support foot portion at each of its opposite ends, with each support foot portion secured to the outer body surface of the vehicle. A sensor may be mounted on the at least one support rail or one of the support feet portions for sensing a characteristic within a field of view around the vehicle and providing related information to a subsystem of the vehicle.

20 Claims, 21 Drawing Sheets

Related U.S. Application Data

(60) Provisional application No. 61/561,325, filed on Nov. 18, 2011.

(51) Int. Cl.
   *B60R 9/058* (2006.01)
   *B60K 16/00* (2006.01)
   *F21Y 115/10* (2016.01)

(56) References Cited

U.S. PATENT DOCUMENTS

| | | |
|---|---|---|
| 5,347,434 A | 9/1994 | Drake |
| 5,422,794 A | 6/1995 | Drake |
| 6,114,954 A | 9/2000 | Palett et al. |
| 6,550,414 B1 | 4/2003 | Correll et al. |
| 6,682,132 B1 | 1/2004 | Hahn |
| 6,702,370 B2 | 3/2004 | Shugar et al. |
| 6,779,696 B2 | 8/2004 | Aftanas et al. |
| 6,827,532 B1 | 12/2004 | Nix |
| 7,081,810 B2 | 7/2006 | Henderson et al. |
| 7,198,184 B2 | 4/2007 | Aftanas et al. |
| 7,377,674 B2 | 5/2008 | Klinkman et al. |
| 8,414,168 B2 | 4/2013 | Jutila et al. |
| 9,527,435 B2 | 12/2016 | Michie et al. |
| 2005/0212249 A1 | 9/2005 | Lopez |
| 2007/0151188 A1 | 7/2007 | Aftanas |
| 2007/0205240 A1 | 9/2007 | Castro et al. |
| 2007/0217212 A1 | 9/2007 | Klinkman et al. |
| 2008/0128187 A1 | 6/2008 | Hu |
| 2011/0084102 A1 | 4/2011 | Sautter et al. |
| 2011/0174855 A1 | 7/2011 | Carothers et al. |
| 2011/0240695 A1 | 10/2011 | Aftanas |
| 2012/0031939 A1 | 2/2012 | Jutila et al. |
| 2013/0106135 A1 | 5/2013 | Praskovsky et al. |
| 2014/0313343 A1 | 10/2014 | Frank et al. |
| 2015/0180178 A1 | 6/2015 | Ranka et al. |
| 2017/0240099 A1* | 8/2017 | Shipman .............. B60Q 1/2611 |

* cited by examiner

VEHICLE ARTICLE CARRIER WITH INTEGRATED CAMERA AND SOLAR POWERED LIGHTING

CROSS-REFERENCE TO RELATED APPLICATIONS

This application is a continuation-in-part of U.S. application Ser. No. 13/678,040, filed Nov. 15, 2012; which claims the benefit of U.S. Provisional Application No. 61/561,325, filed on Nov. 18, 2011. The entire disclosure of each of the above applications is incorporated herein by reference.

FIELD

The present disclosure relates to vehicle article carrier systems, and more particularly to a vehicle article carrier system having at least one sensor integrated into it, and optionally a solar panel, a battery chargeable by the solar panel, and one or more other antennas or electronic subsystems, all mounted on or integrated into one or more structural members of the vehicle article carrier system.

BACKGROUND

This section provides background information related to the present disclosure which is not necessarily prior art.

Vehicle article carriers are used in a wide variety of applications to transport variously articles above an outer body surface of a vehicle. Typical vehicles, without limitation, are cars, trucks, SUVs, station wagons, minivans, full size vans and pickup trucks. The assignee of the present application, JAC Products, Inc. has been a leader in the design, development and production of a wide variety of vehicle article carriers for use on motor vehicles.

While previously developed vehicle article carriers developed by the assignee have proven to be successful and highly useful in transporting articles, typically such systems have not incorporated a variety of electronic components and subsystems that could be highly useful to other subsystems of the vehicle and/or to the general use and operation of the vehicle. Since the vehicle article carrier components, being typically mounted on a roof surface of a vehicle, have an excellent "field of view", the overall operation of the vehicle would be significantly enhanced by integrating one or more electronic components into the vehicle article carrier that take advantage of the superior field of view offered by the various components of a roof mounted vehicle article carrier system.

SUMMARY

In one aspect the present disclosure relates to a vehicle article carrier system for carrying articles above an outer body surface of a vehicle. The system may comprise at least one support rail secured to the outer body surface. The at least one support rail may include a support foot portion at each of its opposite ends, with each support foot portion being adapted to be secured to the outer body surface of the vehicle. A sensor may be mounted on at least one of the at least one support rail or one of the support feet portions for sensing a characteristic within a field of view around the vehicle and providing related information to a subsystem of the vehicle.

In another aspect the present disclosure relates to a vehicle article carrier system for carrying articles above an outer body surface of a vehicle. The system may comprise a pair of support rails secured to the outer body surface, each of the support rails including a support foot portion at each of its opposite ends, and each support foot portion adapted to be secured to the outer body surface of the vehicle. A sensor may be included which is mounted on at least one of the support rails or one of the support feet portions. The sensor may be used for sensing a characteristic within a predetermined field of view around the vehicle and providing information to a subsystem of the vehicle. A battery may also be included which is supported on at least one of the support rails or one of support feet portions, for powering the sensor.

In still another aspect the present disclosure relates to a vehicle article carrier system for carrying articles above an outer body surface of a vehicle. The system may comprise a pair of support rails secured to the outer body surface, with each support rail including a front support foot portion and a rear support foot portion at opposite ends thereof. Each of the front and rear support foot portions is adapted to be secured to the outer body surface of the vehicle. A sensor may be mounted on at least one of the support rails or one of the support foot portions for sensing a characteristic within a field of view around the vehicle and providing information to an electronic subsystem of the vehicle. A light may also be integrated into at least one of the support rails, or one of the support foot portions. A battery may also be integrated into at least one of the support rails or one the support foot portions, for powering the sensor and the light. The light and the sensor are in communication with an electronic control unit (ECU) of the vehicle and under the control of the ECU.

DRAWINGS

The drawings described herein are for illustration purposes only and are not intended to limit the scope of the present disclosure in any way.

Figure 2:
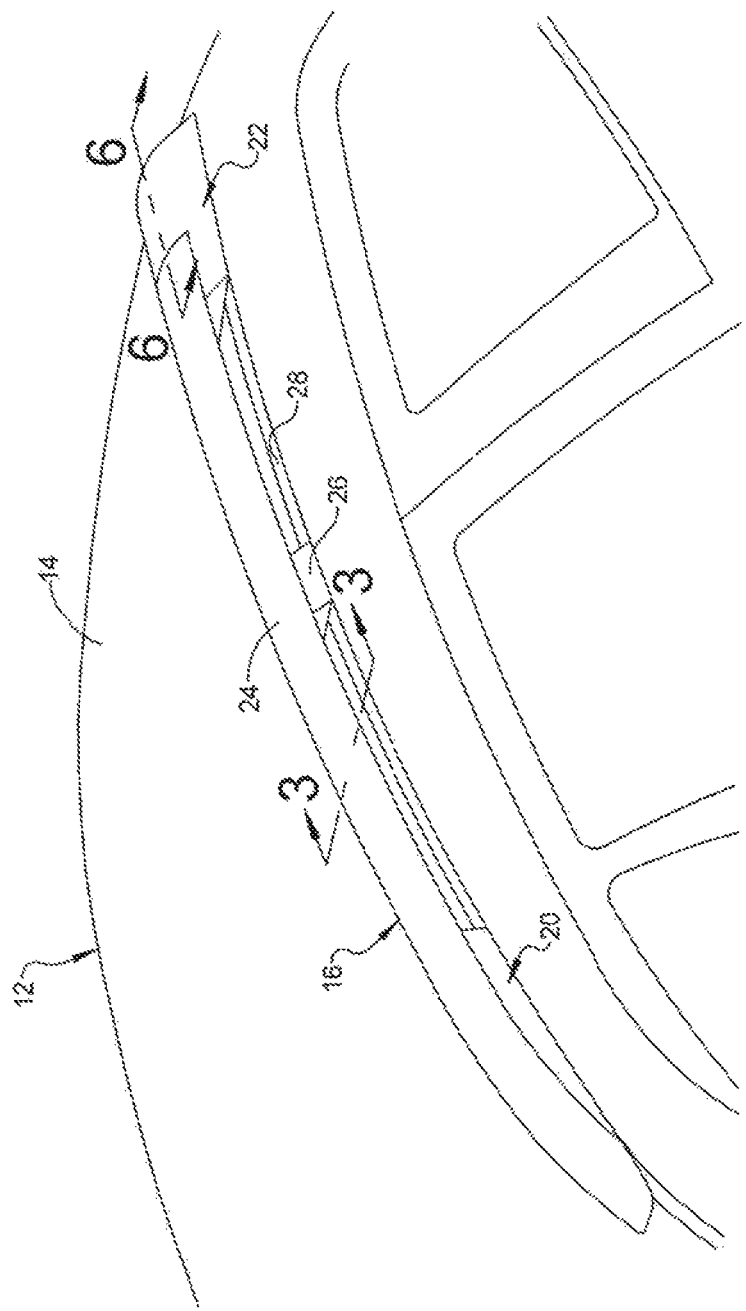
FIG. 2 is an enlarged perspective view of just one support rail of the system of FIG. 1 secured to the outer body surface of the vehicle.
Figure 8:
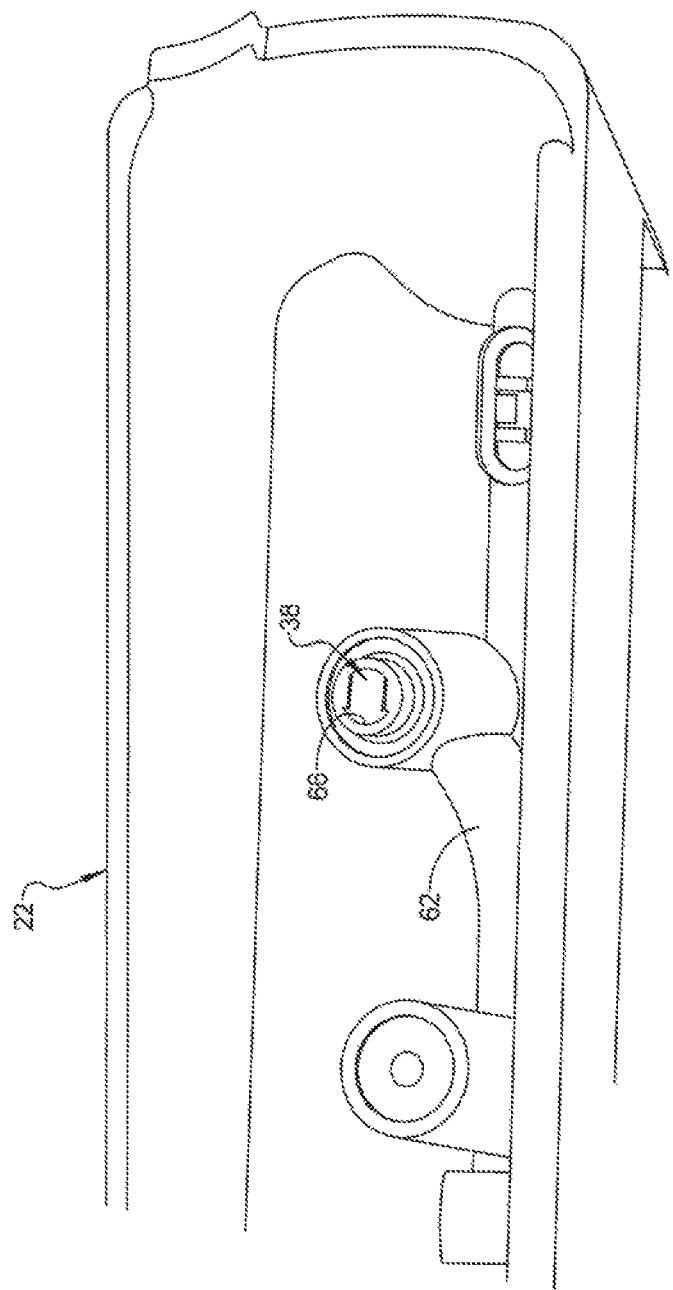
Figure 9:
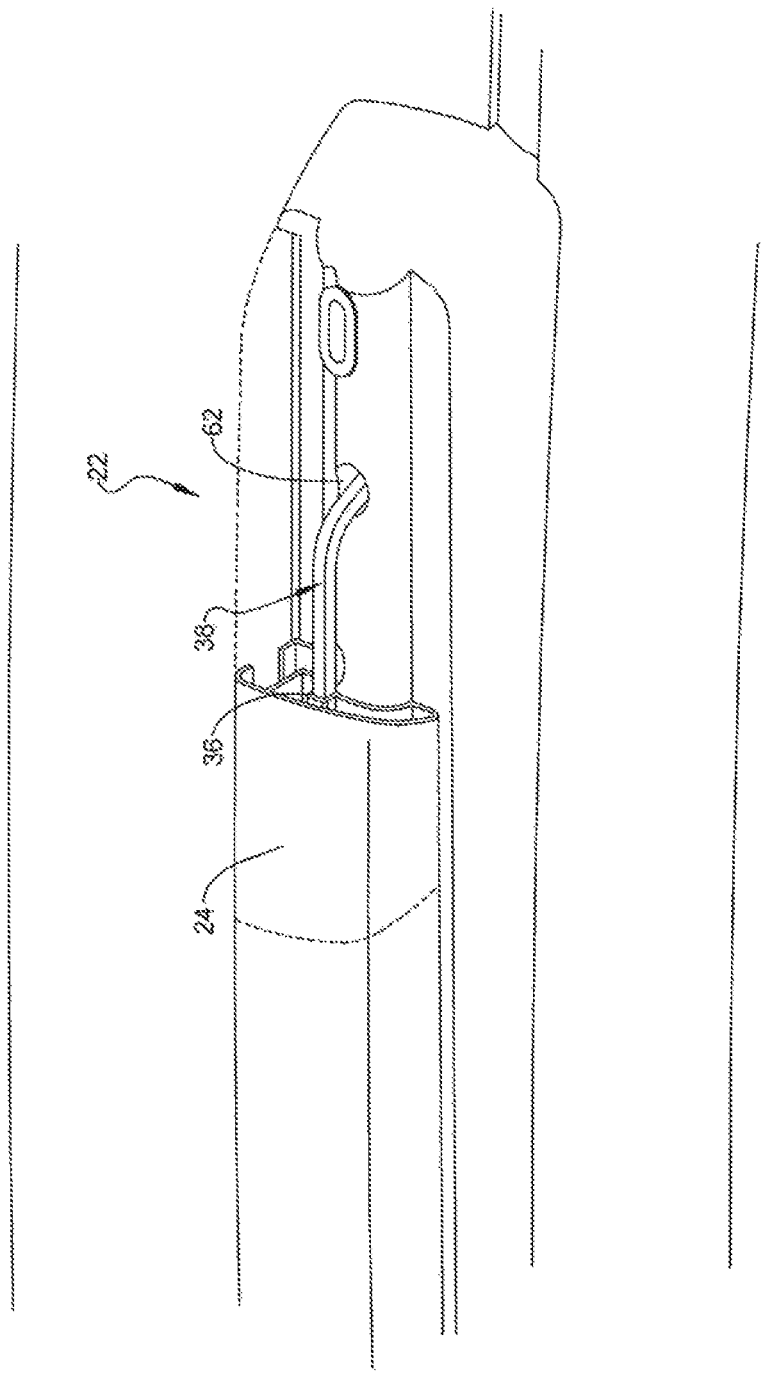
Figure 10:
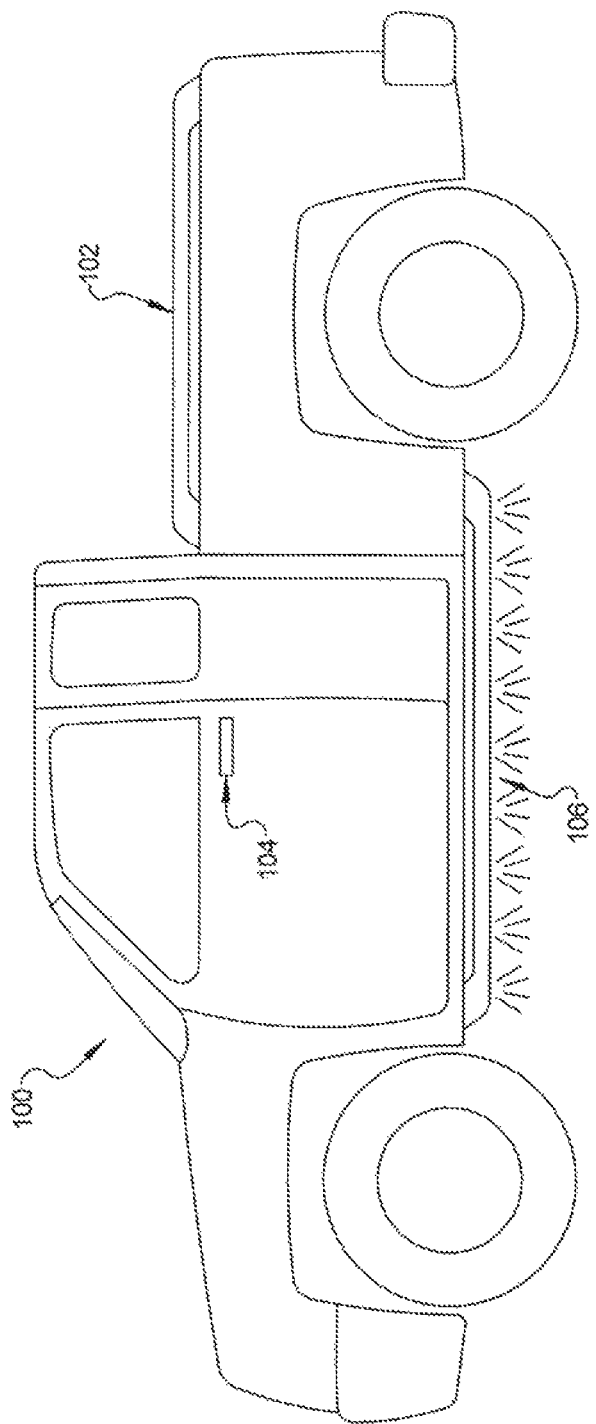
Figure 11:
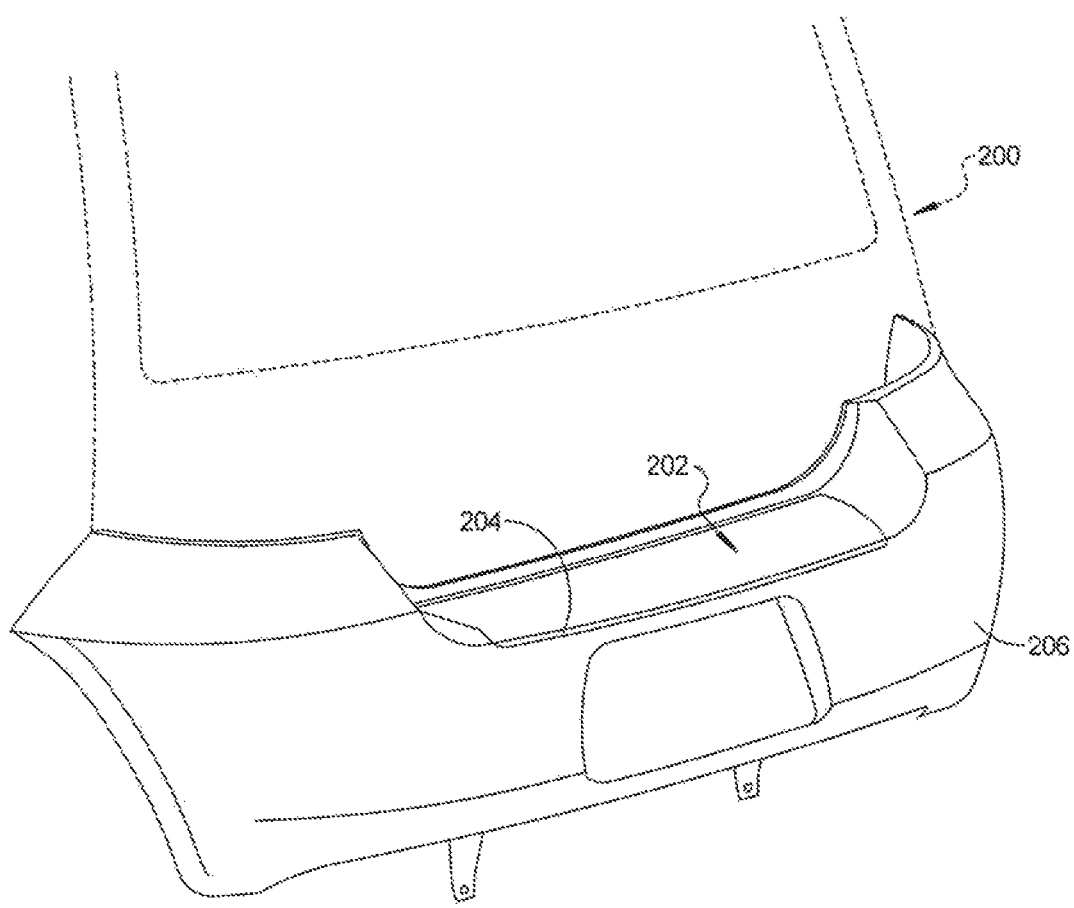
Figure 12:
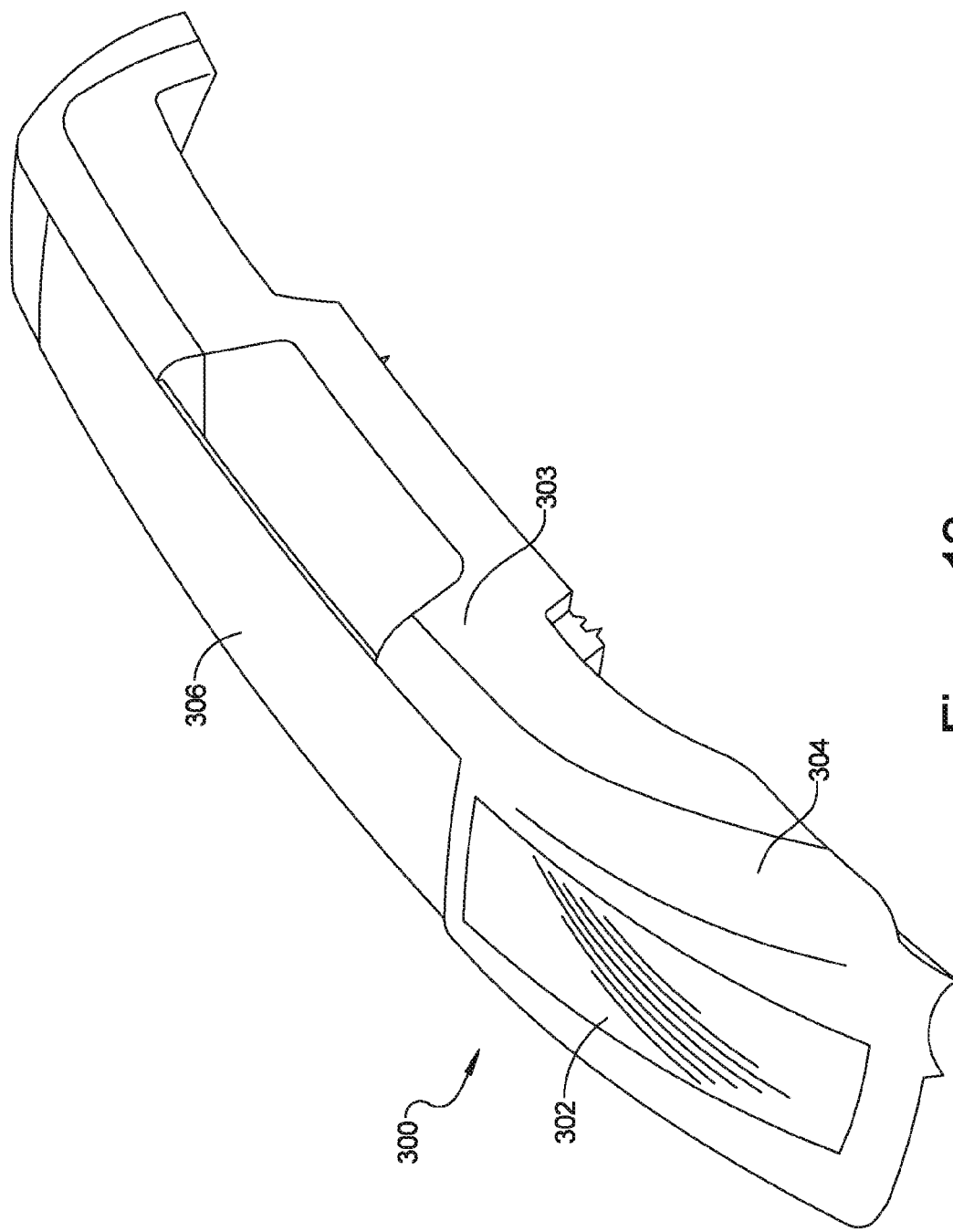
Figure 13:
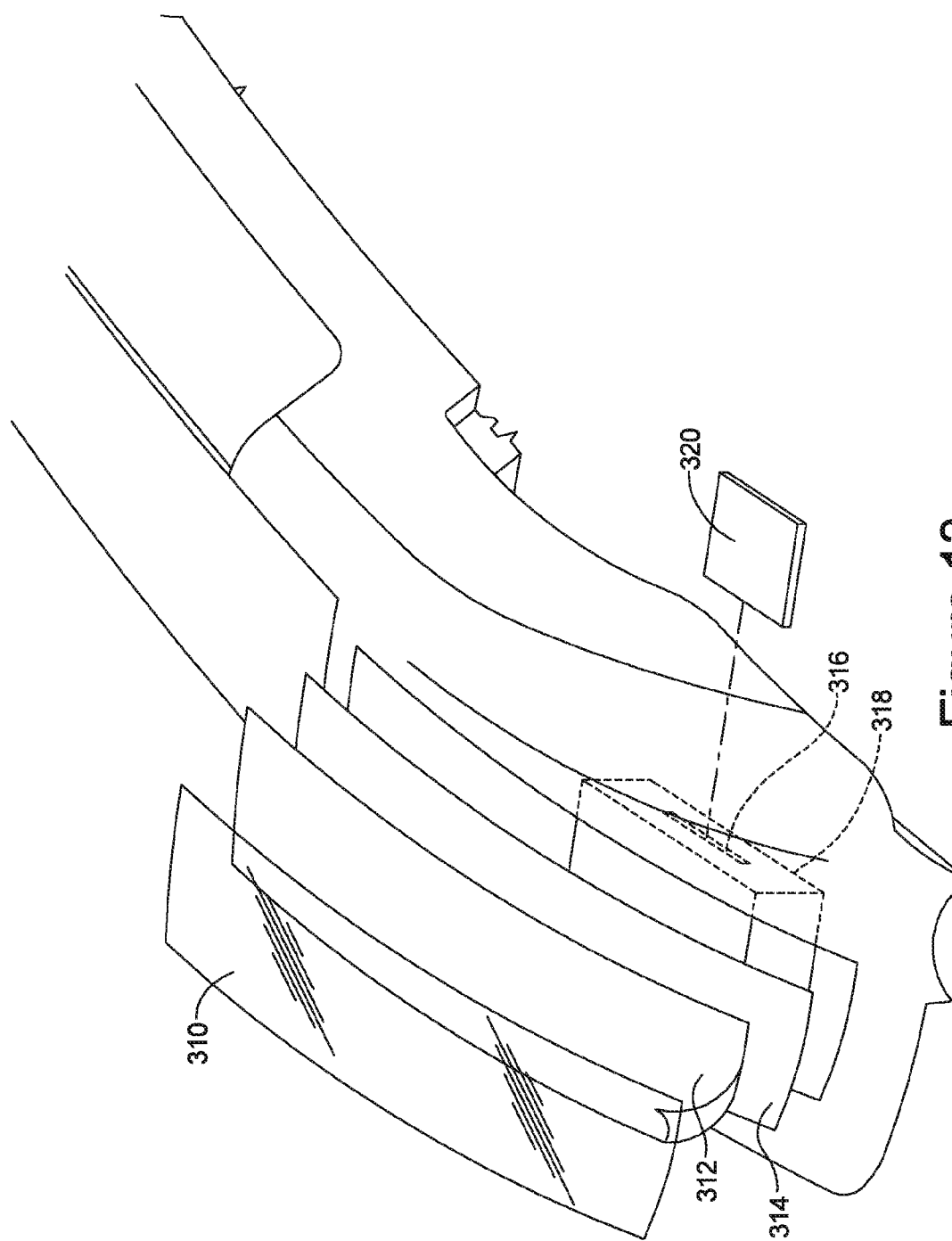
Figure 14:
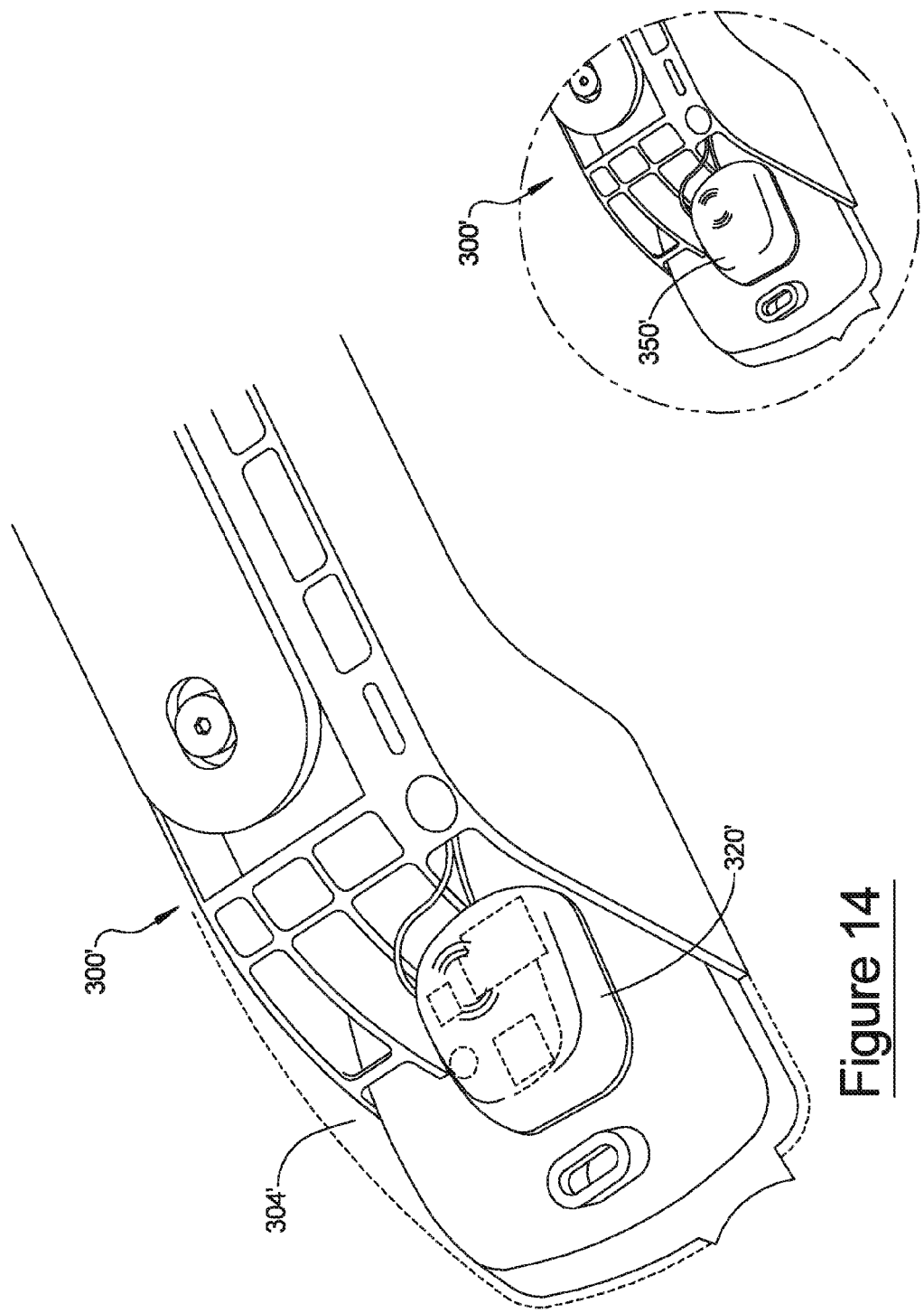

2 attached, to illustrate the LED housing and the light that is projected upwardly through the hole in the outer body surface;

FIG. 8 is a perspective view of the undersurface of a portion of the rear support foot portion of the support rail of FIG. 2 illustrating how the input end of the light transmitting element is supported in a boss portion within the rear support foot portion;

FIG. 9 is a partial cross sectional view of the rear support foot used to support the support rail of FIG. 2, and how the light transmitting element passes through an opening in surface portion into the boss portion;

FIG. 10 is a side view of a pickup truck incorporating a grab rail, a door handle molding and a step bar that each incorporates the teachings of the present disclosure; and FIG. 11 is a perspective view of a rear bumper of a sport utility vehicle that incorporates a light transmitting element in the step bumper portion of the rear bumper, in accordance with the teachings of the present disclosure;

FIGS. 12 and 13 illustrate another embodiment of a support rail that includes an integrated solar panel cell, battery and wireless receiver;

FIG. 14 shows an electronic assembly that may be mounted in one of the support feet to assist or enable functions relating to satellite radio, GPS or other wireless signal operations;

FIG. 14A is a perspective view of a cover that may be used to form a hermetically sealed enclosure for the circuit board of FIG. 14.

Figure 15:
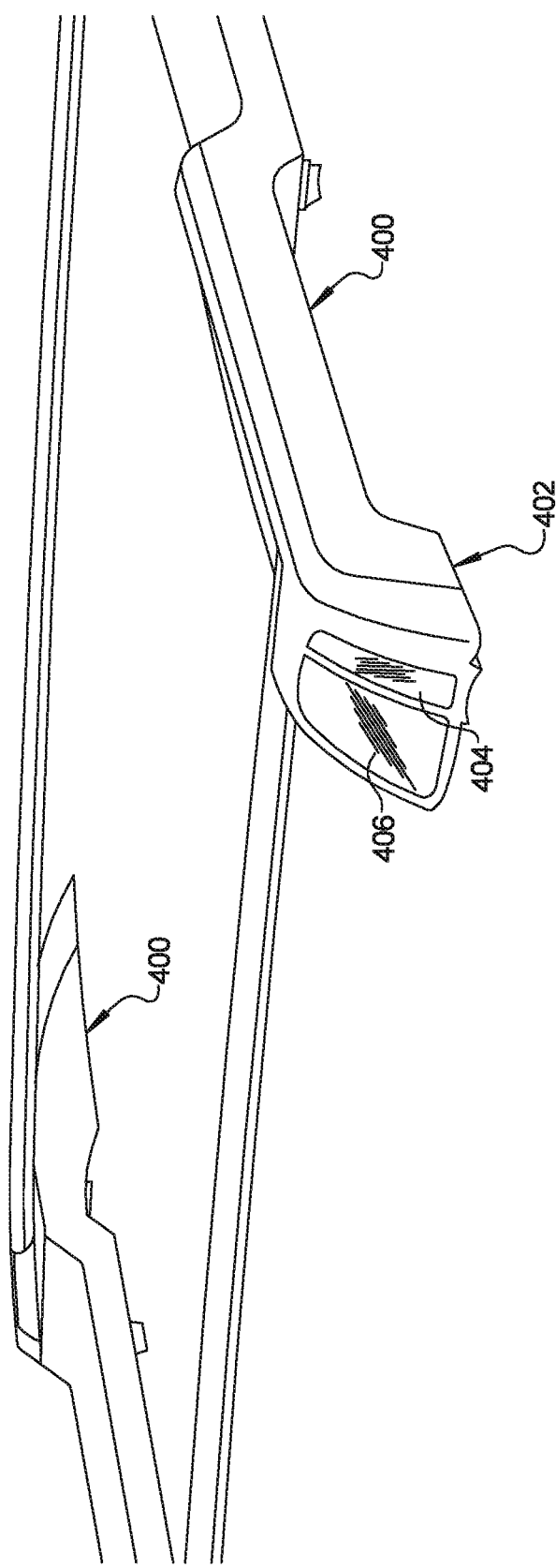
Figure 16:
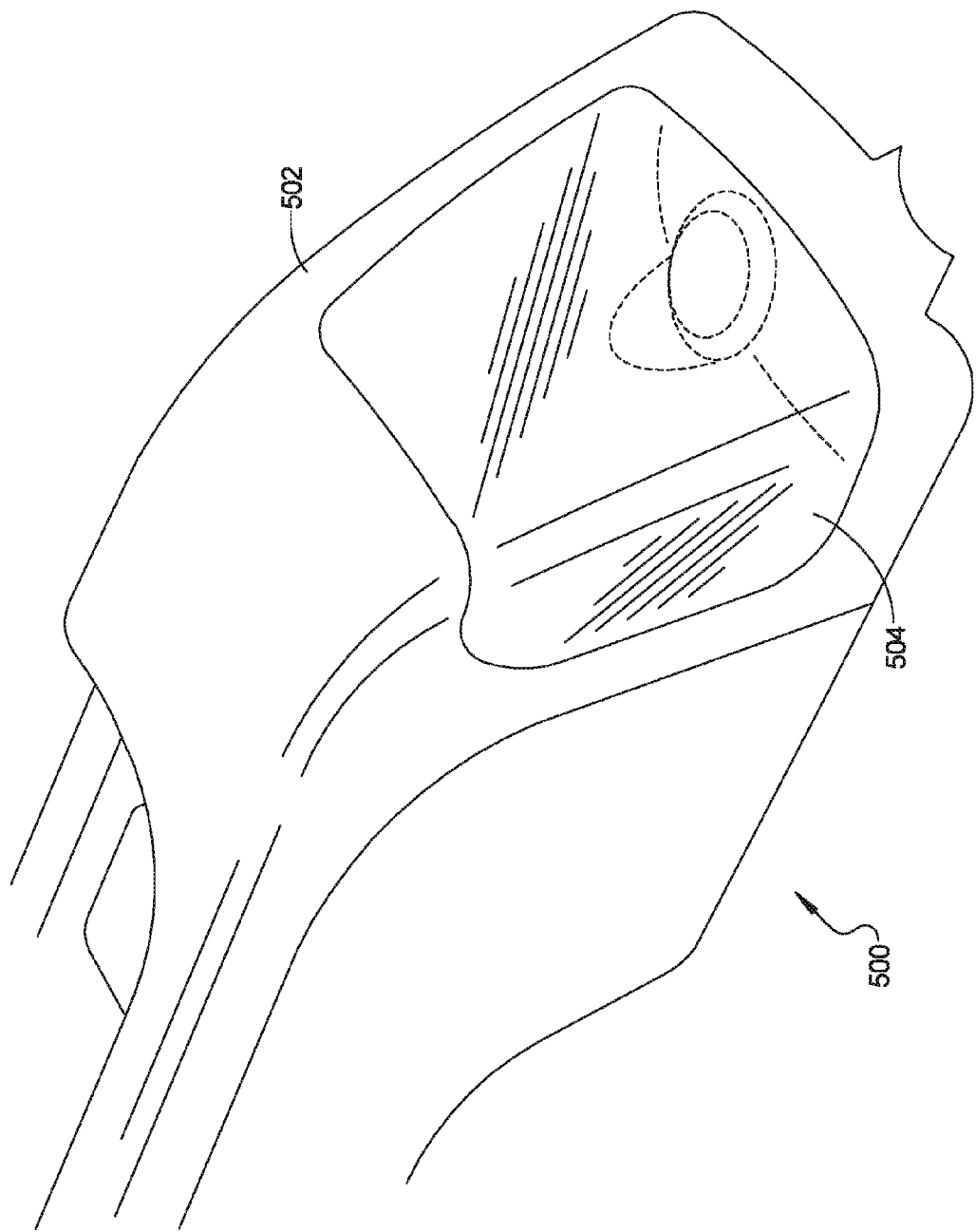
Figure 17:
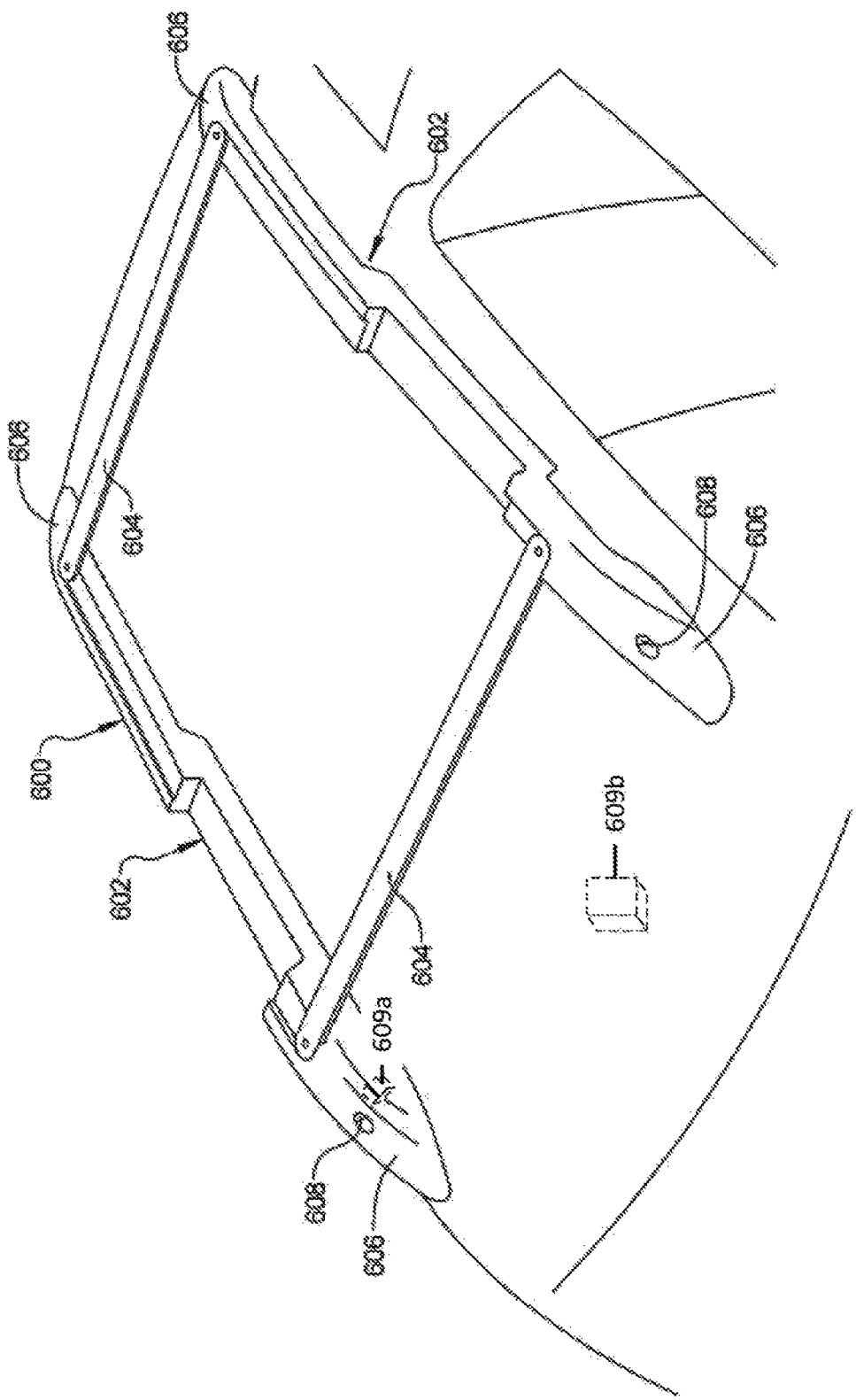
Figure 18:
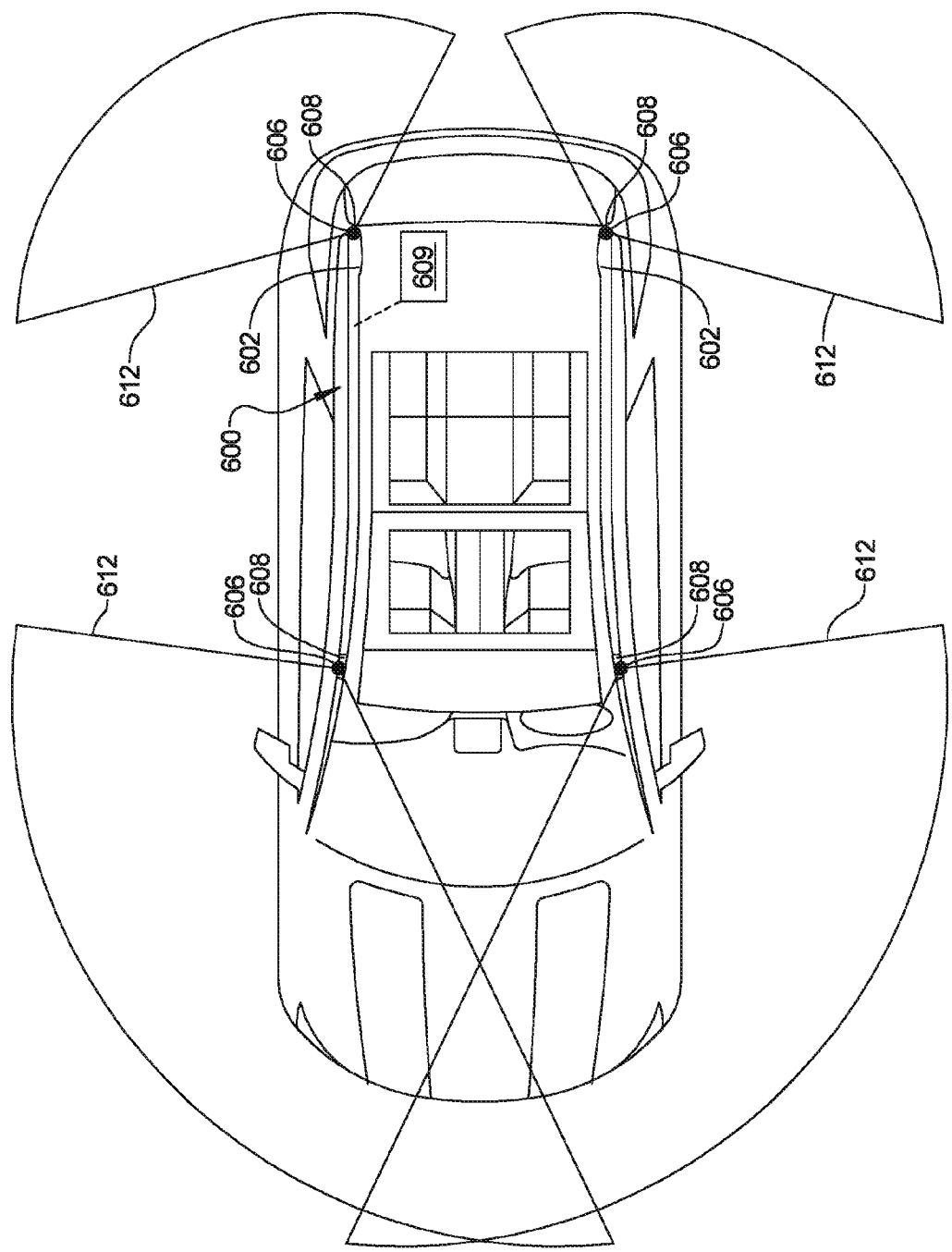
Figure 19:
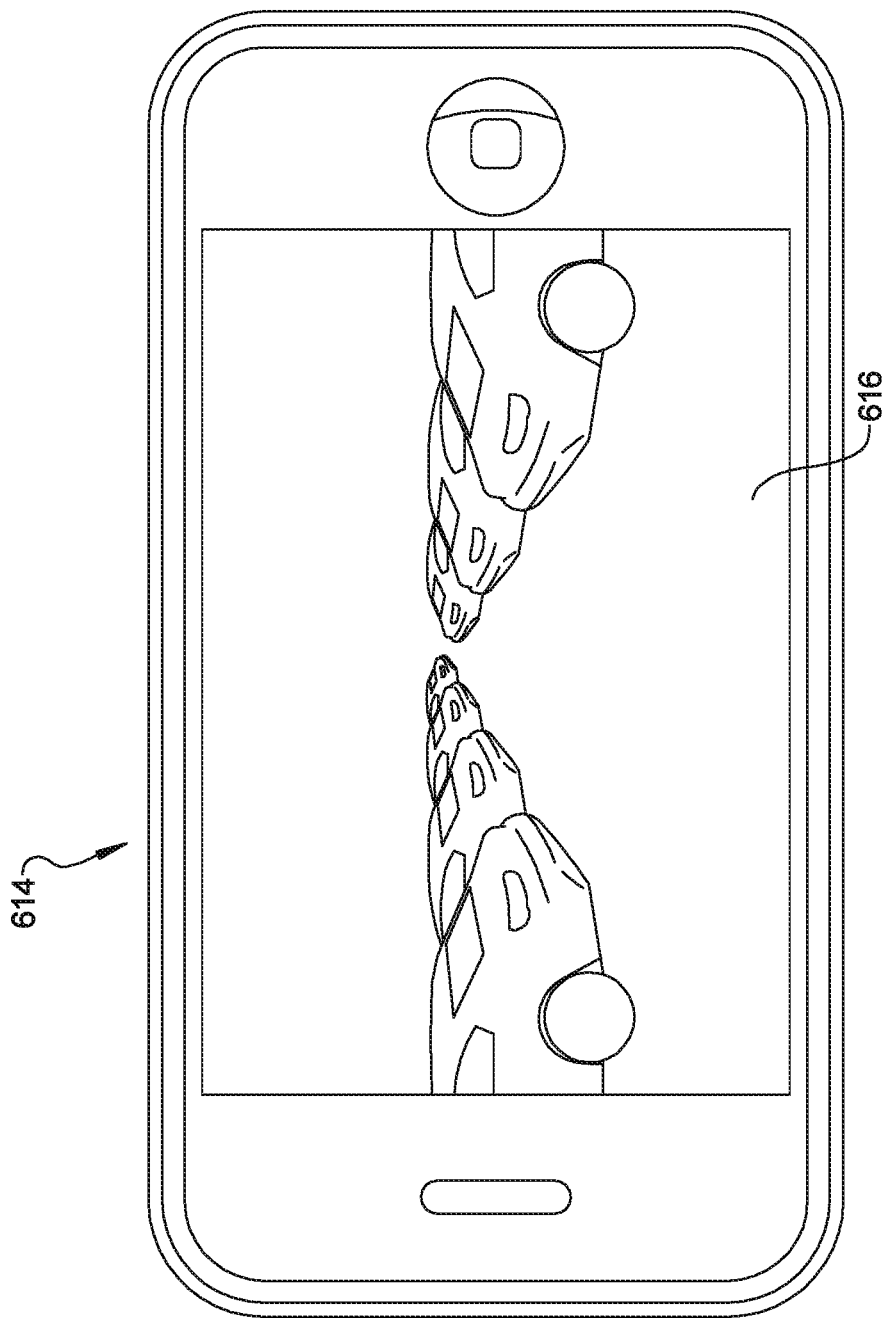
Figure 20:
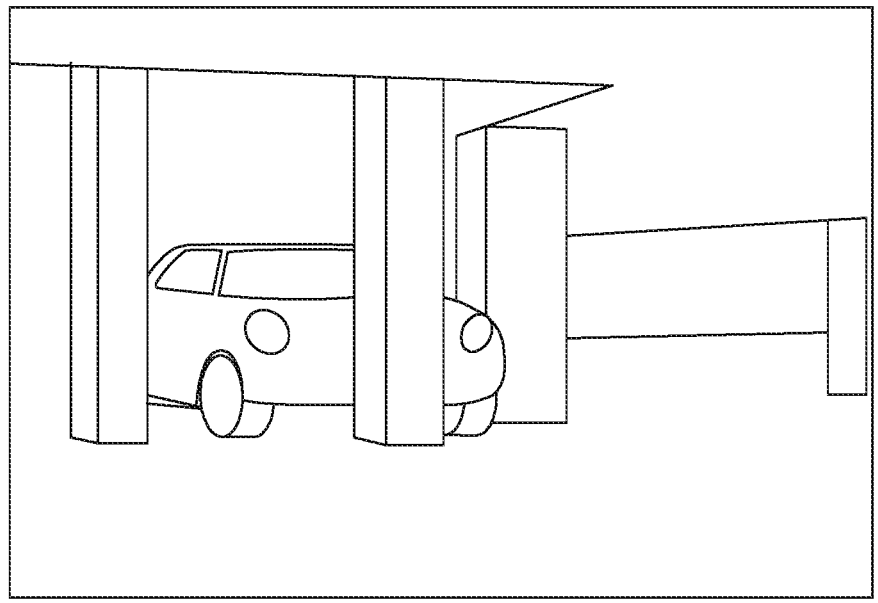
Figure 21:
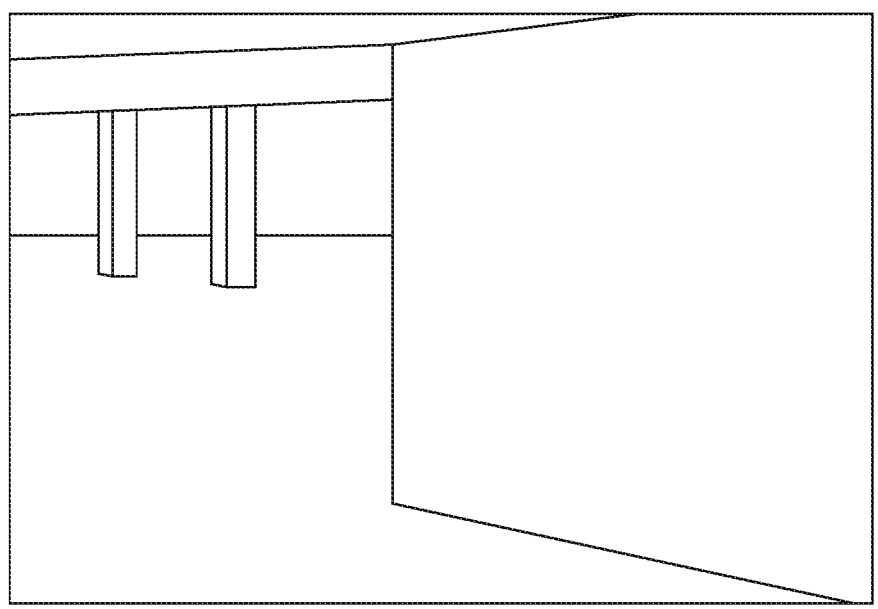
Figure 22:
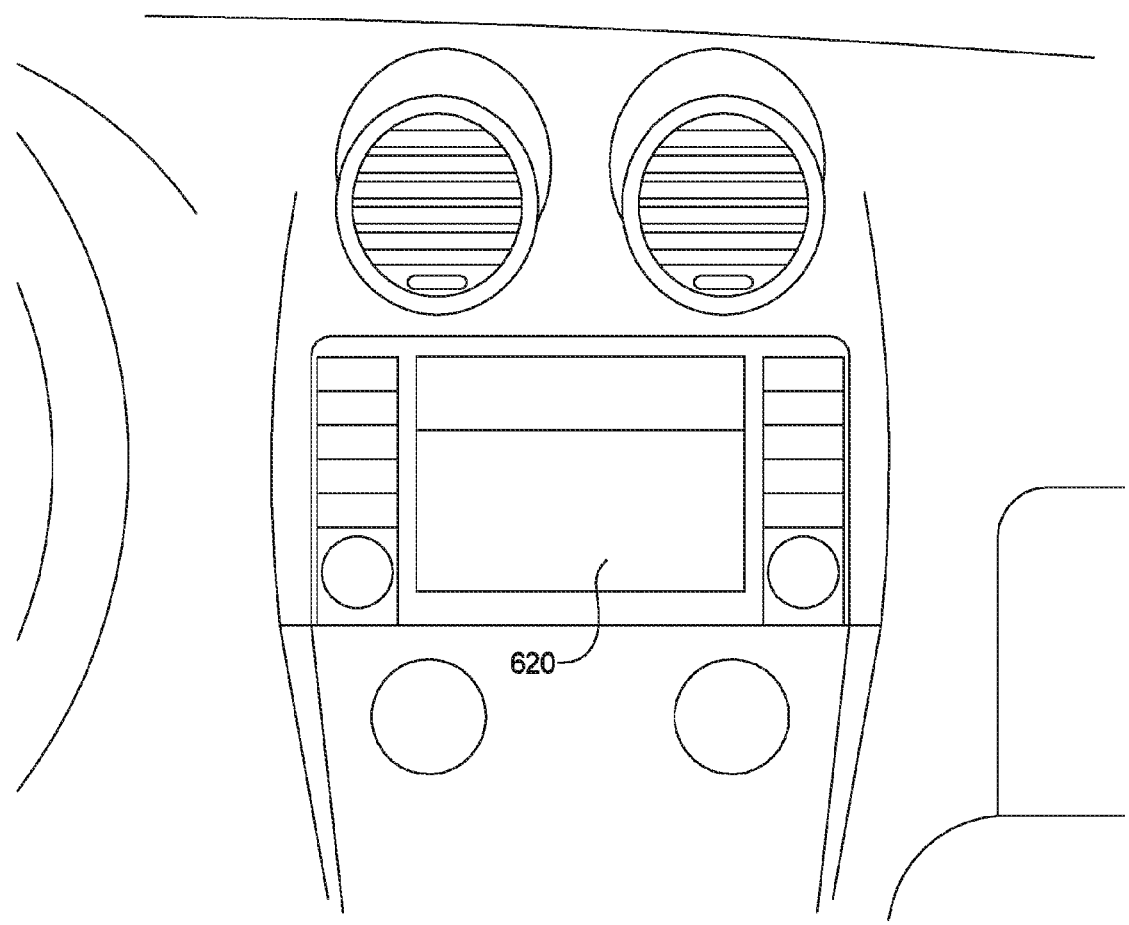
Figure 23:
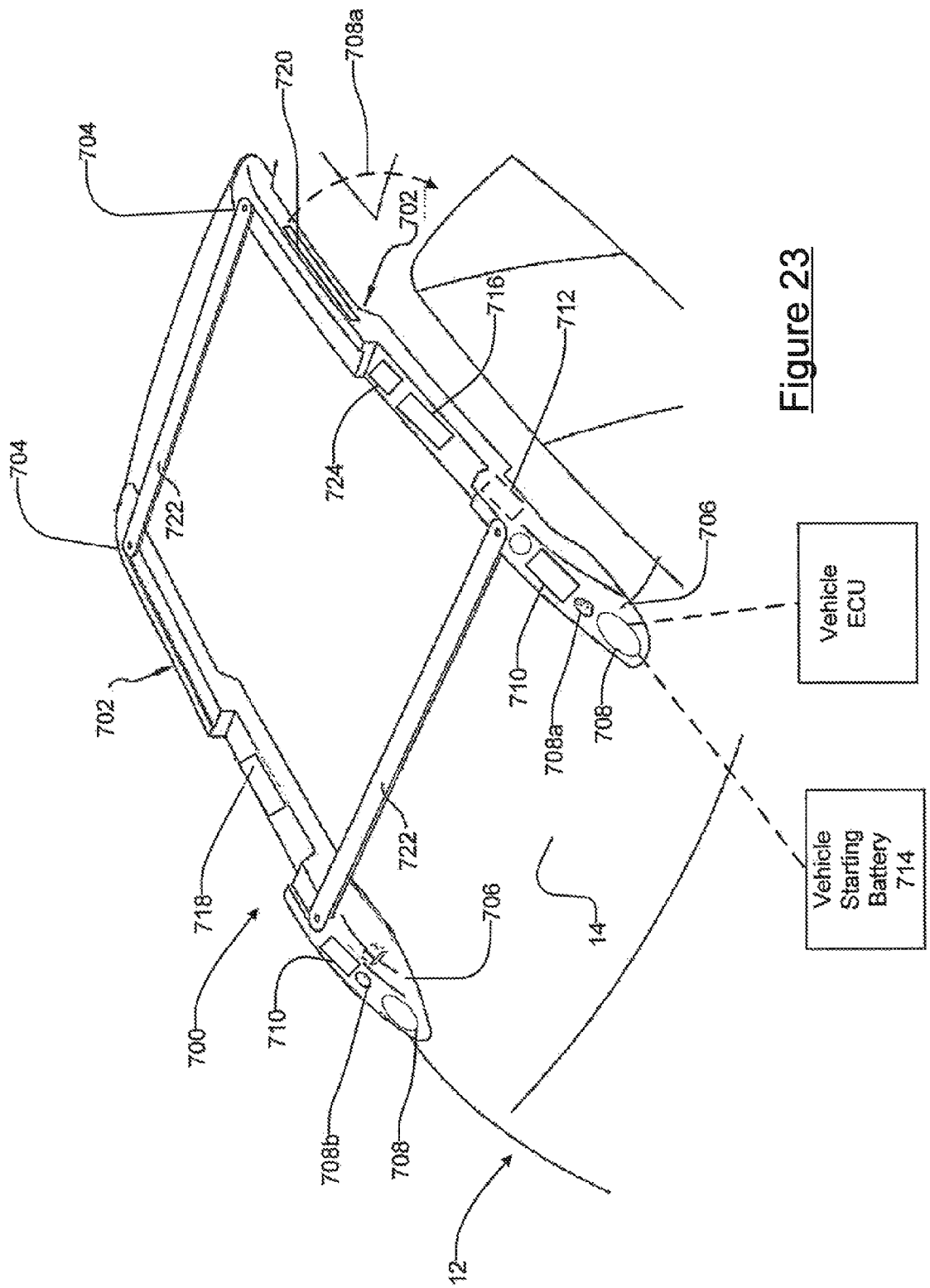

FIG. 15 illustrates another embodiment of a support rail that includes a pair of rear facing (relative to the vehicle) support feet that each include an integrated light and a reflector;

FIG. 16 illustrates another embodiment of a support rail in which the support rail includes an enlarged, integrated reflector built into its rear support foot;

FIG. 17 illustrates another embodiment of a support rail in which a pair of support feet of the support rail each include a camera 608 that is able to image a predetermined range or swath of area adjacent to the vehicle;

FIG. 18 is a planar view of a vehicle incorporating a pair of the support rails of FIG. 17, with each of the support rails including a camera at each of its support feet, and showing the coverage area provided by the four cameras;

FIG. 19 shows an image that may be transmitted by one of the cameras of FIG. 18 to a user's cell phone for display;

FIG. 20 shows a view from a different one of the cameras on the support rails of FIG. 18;

FIG. 21 shows yet another view from a different one of the cameras of the support rails of FIG. 18;

FIG. 22 is a view of an in-dash display system of the vehicle which is used for displaying images from one or more selected ones of the cameras;

FIG. 23 is a high level perspective view of another embodiment of a vehicle article carrier system in accordance with the present invention that also incorporates a plurality of electronic devices and subsystems integrated into the system.

Corresponding reference numerals indicate corresponding parts throughout the several views of the drawings.

DETAILED DESCRIPTION

The following description is merely exemplary in nature and is not intended to limit the present disclosure, application, or uses.

Figure 1:
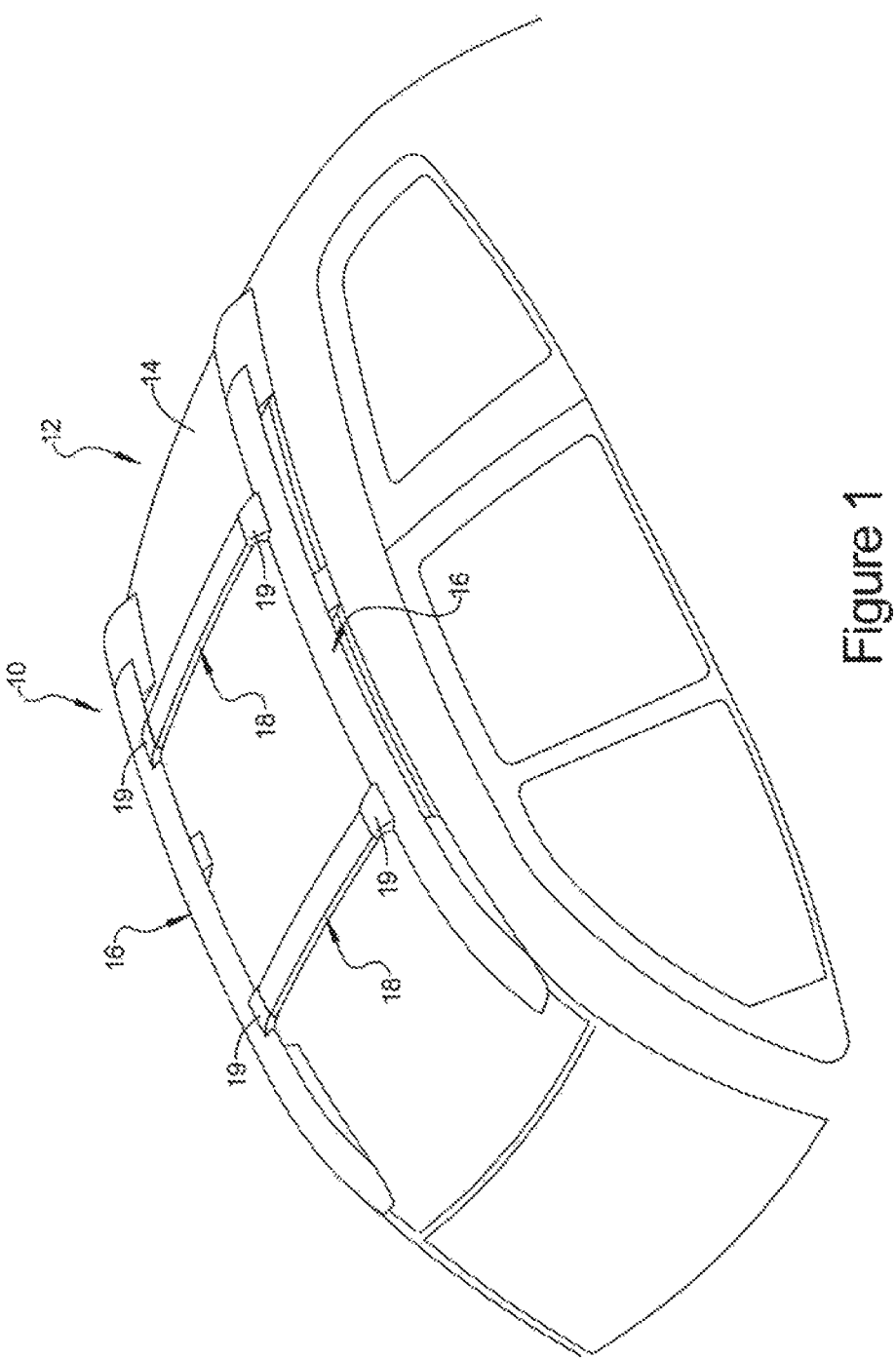
FIG. 1 shows a perspective view of one embodiment of a vehicle article carrier system in accordance with the present disclosure, with the system being secured to an outer body surface of a passenger motor vehicle.

Referring to FIG. 1 a motor vehicle 12 is shown in which one embodiment of a vehicle article carrier system 10 in accordance with the present disclosure is secured to the motor vehicle 12. The vehicle article carrier system 10 is secured to an outer body surface 14 of the motor vehicle 12 and includes a pair of support rail assemblies 16 secured parallel to one another to extend along a major longitudinal axis of the motor vehicle 12. A pair of cross bars 18 is supported by the support rail assemblies 16 such that the cross bars 18 extend perpendicularly across between the support rail assemblies 16. Each of the cross bars 18 may incorporate an end support 19 at both ends thereof that may be secured to the support rail assemblies 16. While two cross bars 18 are shown, it will be appreciated that a greater or lesser number of cross bars may be employed. One or both of the cross bars 18 may be adjustably positionable on the support rail assemblies 16 to better configure them to support variously sized articles thereon above the outer body surface 14. The vehicle article carrier system 10 may be used on sedans, wagons, cross overs, sport utility vehicles, and possibly even over the bed of a pickup truck with possibly only minor modifications. Accordingly, the vehicle article carrier system 10 is not limited to use with only one specific type of vehicle.

Referring to FIG. 2 an enlarged illustration of one of the support rail assemblies 16 is provided. In this example both of the support rail assemblies 16 are of identical construction, so the following description of the construction of one of the support rail assemblies 16 shown in FIG. 2 will apply equally to the construction of the other one of the support rail assemblies 16. The support rail assembly 16 includes a front support foot 20, a rear support foot 22 and a support rail 24 that extends between the front support foot 20 and the rear support foot 22. An optional center support foot 26 is provided in this implementation. A decorative molding 28 is shown positioned in the ditch channel of the outer body surface 14.

Figure 3:
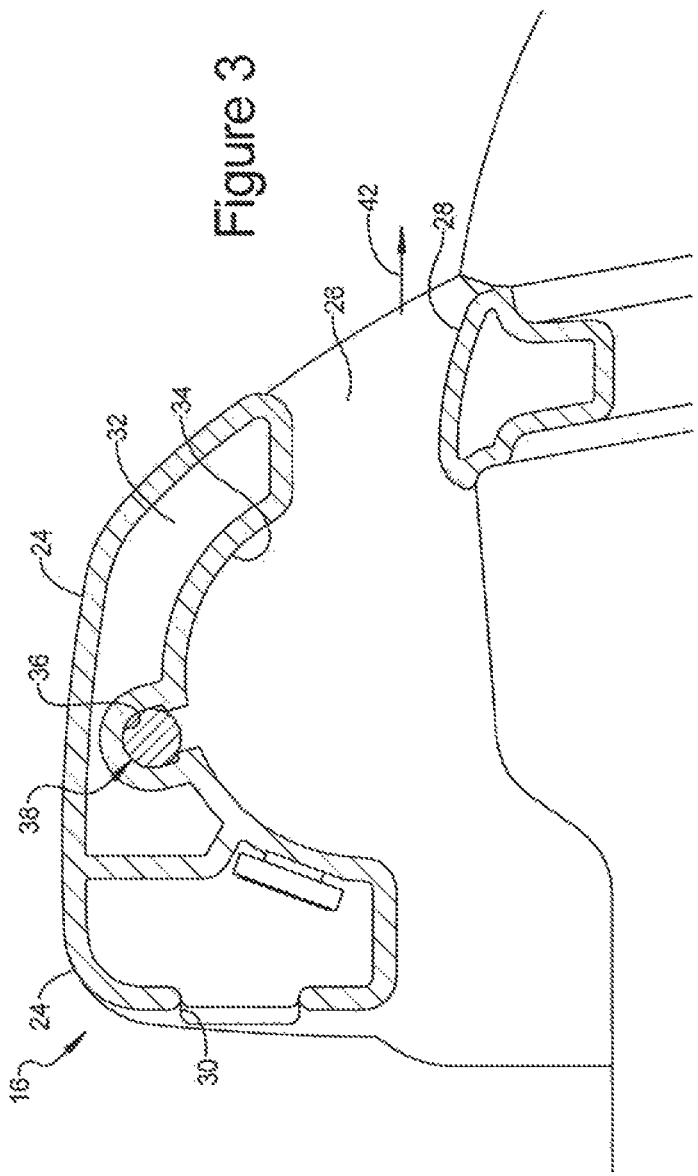
FIG. 3 is a cross sectional end view of the support rail of FIG. 2 taken along section line 3-3 in FIG. 2, illustrating a light transmitting element that is contained within a channel of the support rail, where the light transmitting element generates a quantity of light to assist in lighting the sides of the vehicle.

Referring to FIG. 3, the cross-sectional construction of the support rail 24 is shown. The support rail 24 has a longitudinally extending, sideways opening channel 30 that extends along the support rail 24. The end supports 19 at one end of each of the cross bars 18 may be secured to the channel 30 via any suitable clamping-like structure. Suitable end supports and cross bars are disclosed in U.S. Pat. Nos. 7,198,184 and 6,779,696, as well as U.S. Patent Publication 2007/0151188 owned by JAC Products, Inc., and the disclosure of each of these documents is hereby incorporated by reference into the present disclosure.

The support rail 24 may also include a hollow section 32 and a lower surface that forms a semi-circular shaped undersurface portion 34. A channel 36 may be formed to extend longitudinally along at least a major portion of a length of the support rail 24 in which a light transmitting element 38 is disposed. The light transmitting element 38 may thus extend parallel to a longitudinal axis of the support rail 24 and along a major portion of the longitudinal length of the support rail 24. The light transmitting element 38 may be formed by virtually any type of fiber optic type cable or light transmitting component. Preferably the light transmitting element 38 is at least somewhat flexible. One component that is especially well suited for use as the light transmitting element 38 is a commercially available LED light strip. The LED (Light Emitting Diode) light strip is highly energy efficient and can be driven by a low DC voltage. If a conventional fiber optic cable is used, then a light source will be required to feed an optical signal in to one end or the other of the fiber optic cable. In one embodiment the light transmitting element 38 may simply be inserted into the channel 36 during assembly of support rail 24. Alternatively, suitable fastening clips, adhesives or any other suitable structure could be used to help hold the light transmitting element 38 within the channel 36, if needed. The light transmitting element 38 operates to radiate light along its length, with a substantial portion of the light being directed toward the outer body surface 14 of the vehicle 12. The semi-circular shaped undersurface portion 34 and the decorative molding strip 28 may also help to reflect light towards the side of the vehicle 12 in the direction of arrow 42. The percentage of light reflected may be dependent in part on the color of the semi-circular shaped undersurface portion 34, the precise shape of the semi-circular shaped undersurface portion 34, the color of the outer body surface 14, and the color of the decorative molding strip 28. Optionally, a reflective surface coating may be applied to the semi-circular shaped undersurface portion 34 and/or its shape tailored to reflect the radiated light most efficiently in a desired direction.

Figure 4:
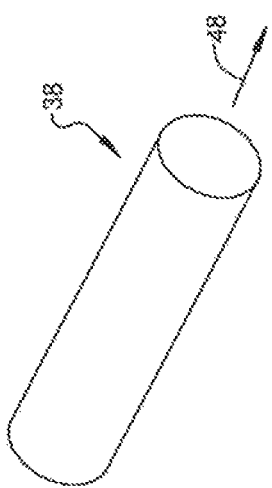
FIG. 4 is a perspective view of a portion of the light transmitting element.

A representative portion of the light transmitting element 38 is shown in FIG. 4. The light transmitting element 38 preferably has dimensions selected in accordance with the inner dimensions of the channel 36 so that it may be slid into the channel, yet still provide at least a small degree of frictional fit within the channel 36. As such, the cross sectional shape of the light transmitting element 38 will be selected at least in part based on the cross sectional shape of the walls that form the channel 36, and such that a significant portion of the light transmitting element 38 will be able to radiate optical energy out from the channel 36. In this regard it will be appreciated that the channel 36 may take a variety of cross sectional shapes, and it will be appreciated that the channel 36 as shown in FIG. 3 is but one suitable cross-sectional shape that may be used.

Figure 5:
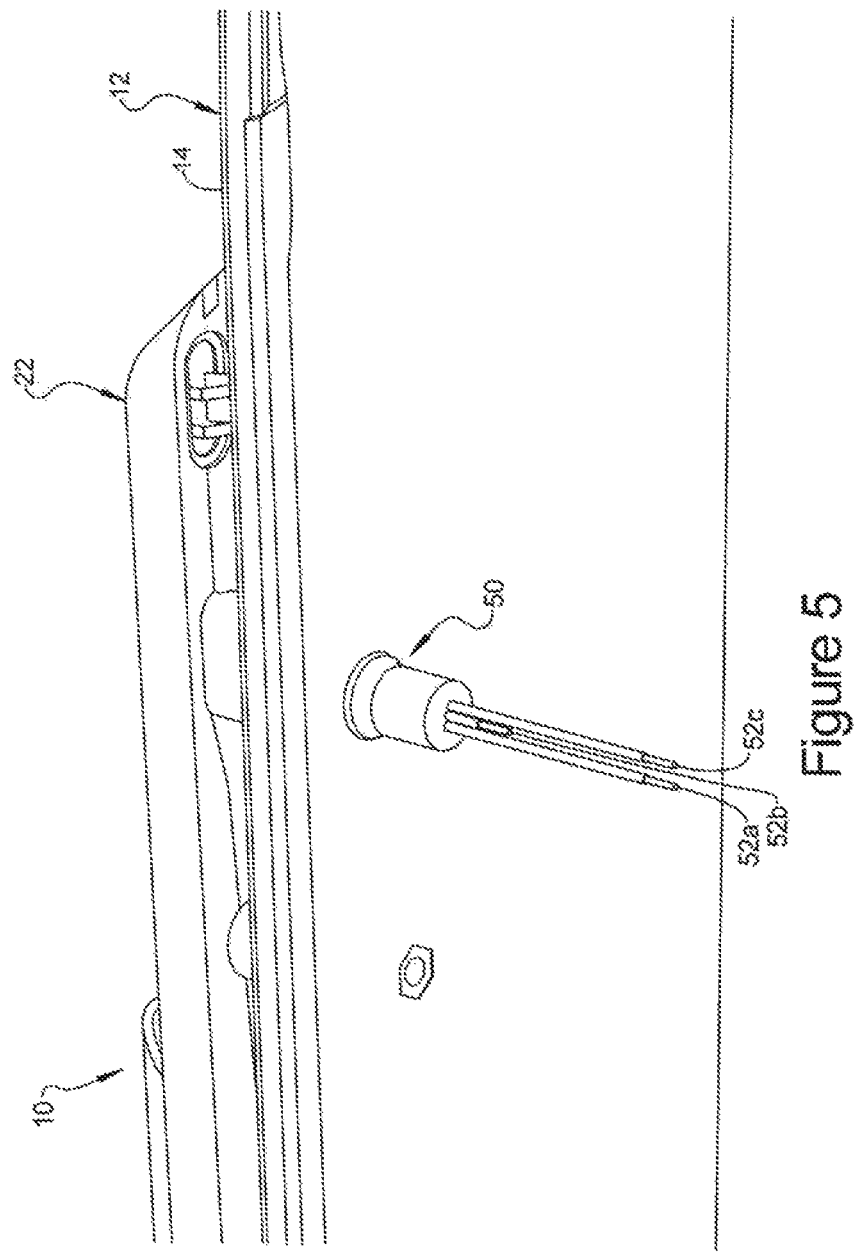
FIG. 5 is a perspective view of a portion of the support rail of FIG. 2 taken from underneath the outer body surface of the vehicle, and showing the LED housing and its associated conductors secured within a hole in the outer body vehicle surface.

Referring to FIG. 5, the rear support foot 22 of the support rail 16 is shown positioned over an LED housing 50 which houses an LED (not visible in FIG. 5) therein. A plurality of electrical conductors 52*a*, 52*b* and 52*c* extend from the LED housing 50 that may be connected to suitable conductors of a wiring harness of the vehicle 12. The conductors 52*a*, 52*b* and 52*c* may be used to allow control over the operation of the LED in accordance with use of a key FOB of the vehicle, a turn signal of the vehicle, or possibly even the headlights or daytime running lights of the vehicle, or possibly when the vehicle's lights are placed in the emergency flashing condition. Thus, the LED can be controlled to turn on for a controlled time when an operator presses an "UNLOCK" button on the vehicle's key FOB. Alternatively, the LED can be turned on by a suitable electrical signal when the vehicle headlights are turned on, when a brake pedal of the vehicle 12 is depressed, or whenever the daytime running lights of the vehicle are turned on, presuming that the vehicle incorporates daytime running lights. It will be appreciated that the ON/OFF operation of the LED could be controlled in virtually any fashion assuming suitable electrical power and control signals are applied thereto.

Figure 6:
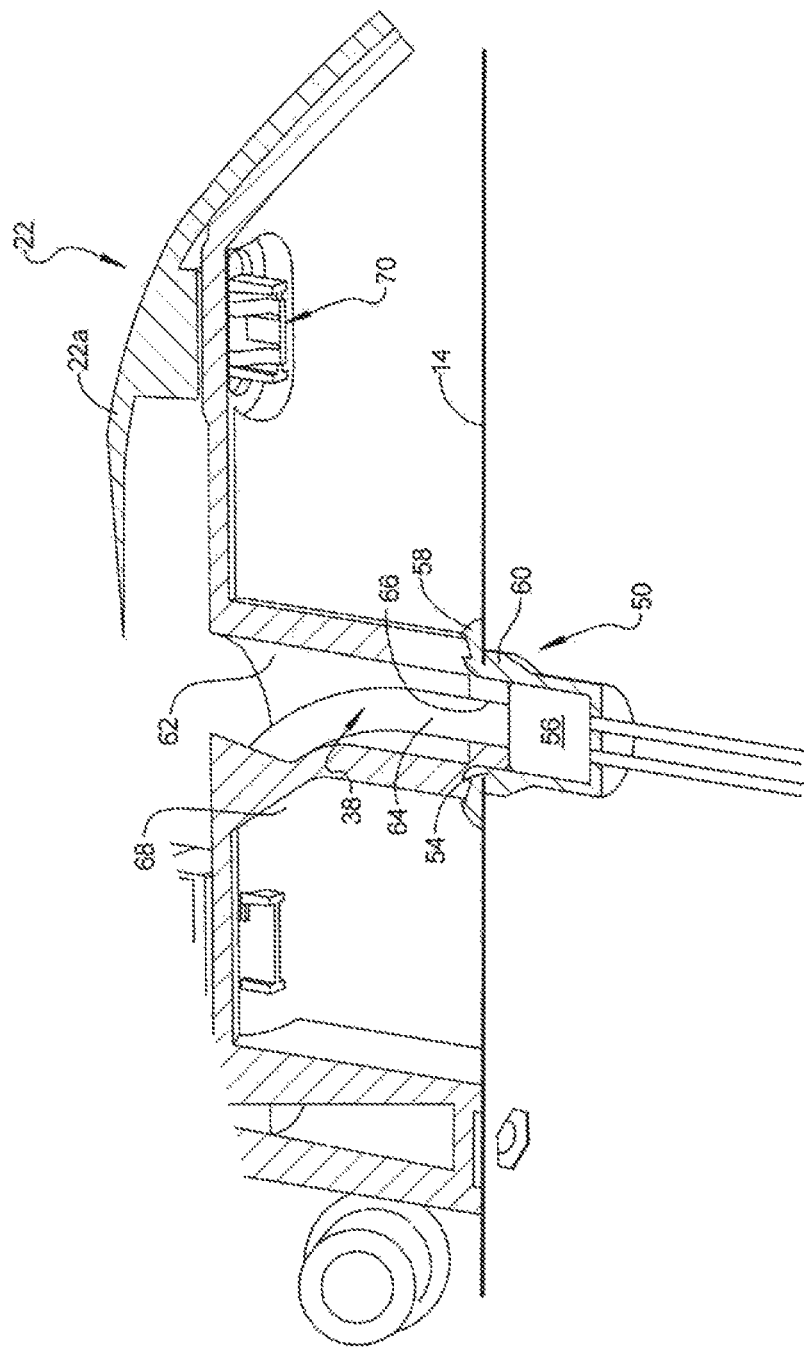
FIG. 6 is a cross sectional view of a portion of one rear support foot taken in accordance with section line 6-6 in FIG. 2 illustrating the abutting coupling of an input end of the light transmitting element with the LED housing, and further illustrating how the LED housing is retained within the hole in the outer body surface of the vehicle.
Figure 7:
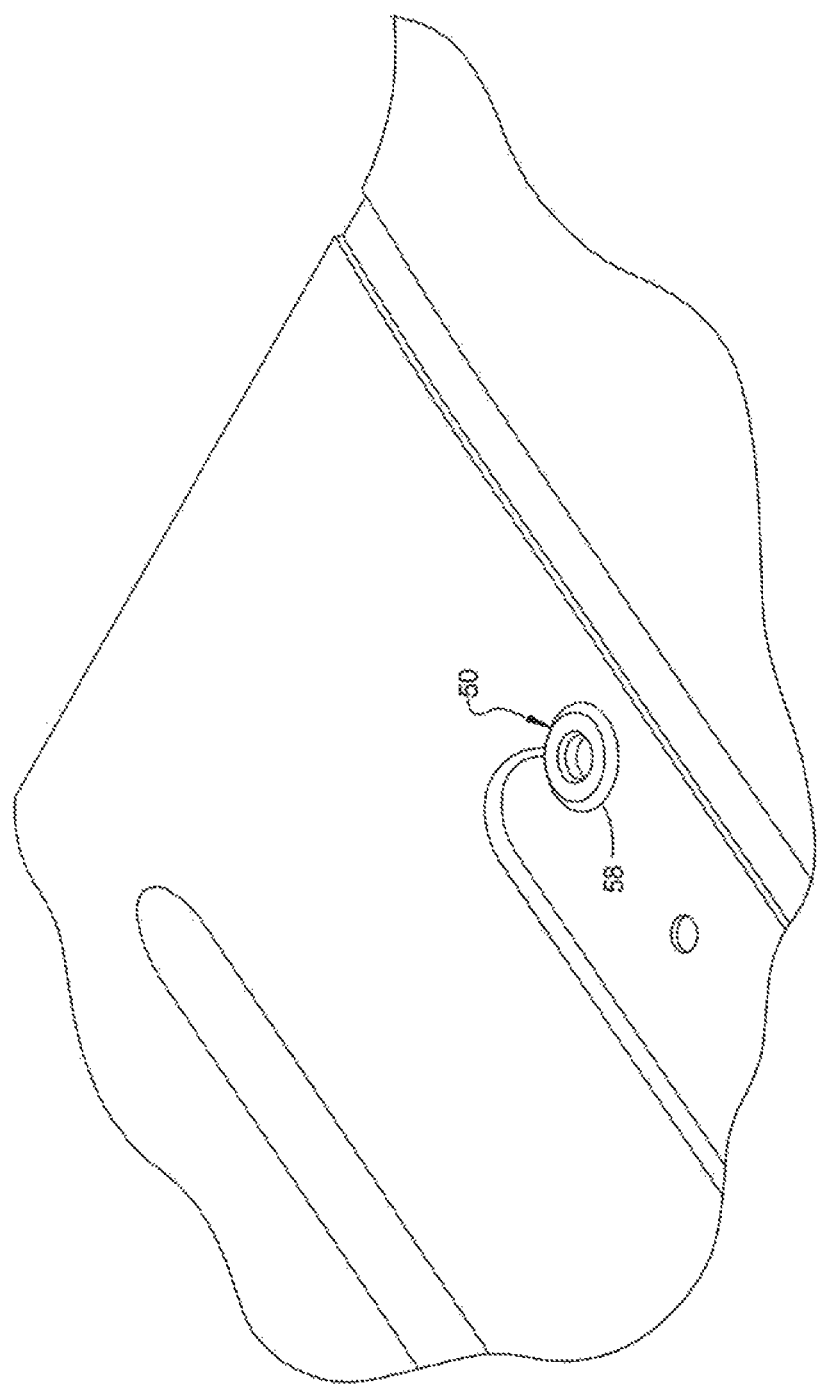
FIG. 7 is a perspective view looking down onto the outer body surface of the vehicle without the support rail of FIG.

With reference to FIG. 6, the LED housing 50 can be seen in greater detail installed within an opening 54 in the outer body surface 14 of the vehicle 12. The LED housing 50 houses at least one LED 56 therein and may be formed from a relatively stiff rubber or a combination of plastic or metal, with a rubber coating there over. The LED housing 50 may preferably incorporate a flange 58 and a lip 60 that form a narrow circumferential channel therebetween. The LED housing 50 may have a diameter that is selected to be just slightly smaller than the diameter of the opening 54, and may be inserted through the opening 54 from an exterior side of the outer body surface 14. When inserted into the opening 54 in this manner the lip 60 is compressed as it passes through the opening 54, and the LED housing 50 then engages the opening so that the LED housing 50 is captured in the channel between the flange 58 and the lip 60. The LED housing 50 is shown in FIG. 7 without the support rail 16 positioned on the outer body surface 14. It will be appreciated that while a single LED 56 is illustrated in FIG. 6 within the LED housing 50, that two or more LEDs could be housed therein depending on the size of the housing and the size of the opening 54. Alternatively the LED housing 50 may form an enclosure for housing a circuit board with one or more LEDs, where the housing is secured by any suitable means over the opening 54. Thus it will be appreciated that the LED housing 50 may take a wide variety of shapes and sizes as needed to meet the needs of a specific application.

With further reference to FIG. 6, the rear support foot 22 may include an integrally formed, curving channel 62 that holds an input end 64 of the light transmitting element 38 and helps to form a 90 degree bend in the light transmitting element 38 as it extends through the channel 62. In this embodiment it will be appreciated that the light transmitting element 38 is a passive component, for example an optical fiber, that requires an optical input signal be input to one end of the light transmitting element 38, and thus that at least one end of the element 38 be placed in close proximity with a light source. In this example the input end 64 may extend through an opening 66 into abutting contact with the LED 56 or close to abutting contact. It is not critical that the input end 64 of the light transmitting element 38 actually contact the LED 56 or be perfectly concentrically aligned with the LED 56. It is sufficient for the LED 56 to transmit substantially all of its optical energy into the light transmitting element 38 if the input end 64 is merely closely adjacent to the LED 56. It is acceptable if the input end 64 is positioned at least within a few millimeters of contacting the LED 56, and substantially concentrically aligned with the LED 56. The channel 62 preferably includes a curving portion 68 that provides a gradual bend to the light transmitting element 38 to prevent kinking it. FIG. 8 illustrates a face of the input end 64 of the light transmitting element 38 as it appears before the rear support foot 22 is secured to the outer body surface 14. FIG. 9 illustrates the rear support foot 22 and the support rail 24 with a portion of the light transmitting element 38 exposed.

It is a significant benefit of the above-described design and construction of the support rail 16 that no electrical or mechanical connectors are required to interface the input end 64 of the light transmitting element 38 to the LED 56, when the light transmitting element is a passive component like a fiber optic cable. Simply positioning the face of the input end 64 of the light transmitting element 38 against, or closely adjacent to, the LED 56 is sufficient to couple the light from the LED 56 into the light transmitting element 38. This arrangement significantly simplifies the construction of the support rail 16, expedites its attachment to the outer body surface 14 and helps to reduce the overall cost of the system 10. Moreover, since no electrical connector is required, there is no possibility that moisture or corrosion of the contacts of the electrical connector may affect the coupling of the optical signal from the LED 56 into the light transmitting element 38.

The support rail 16 may be assembled by positioning (e.g., press fitting) the light transmitting element 38 within the channel 36 of the support rail 24, and such that a predetermined length of the input end 64 is projecting from an end of the support rail 24 that will pass through the rear support foot 22. The free end (i.e., the input end 64) of the light transmitting element 38 is then positioned in the channel 62 of the rear support foot 22 such that the input end extends into the opening 66 (FIG. 6). The rear support foot 22 and the front support foot 20 may then be secured to the outer body surface 14 of the vehicle 12, and the support rail 24 may then be secured to the support foot portions 22 and 24 by any suitable fasteners (not shown). In one embodiment a decorative cover, such as cover 22*a* in FIG. 6, may be secured to the rear support foot 22 to cover the channel 62 and the area where the light transmitting element 38 enters the channel 36 in the support rail 24. Fastening of the decorative cover 22*a* may be accomplished by the use of suitable cooperating flexible tab structures 70 on the decorative cover 22*a* and the rear support foot 22, or by any other suitable means of attachment.

It will be appreciated that while the support rail 16 has been described as incorporating a single length of the light transmitting element 38, that two or more separate lengths of the light transmitting element 38 may be incorporated. In such an implementation, a corresponding number of LEDs 56 may be incorporated to provide an independent optical signal to each section of the light transmitting element 38. In some applications this may provide more uniform intensity of illumination along the full length of the component being illuminated.

If the light transmitting element 38 is a DC powered light strip, then it will be appreciated that the LED housing 50 and the LED 56 will not be needed. Instead a suitable connection will need to be made to the light transmitting element to supply the needed DC power to it. The connection may be a physical plug-and-socket connection, or it may be an inductive coupling. If an inductive coupling is used, then magnets may also be used, one being at one end of the light transmitting element and the other being associated with the DC power source, such that when the two magnets are brought into close proximity to one another they will attract and physically engage one another. However, virtually any type of coupling could be used to facilitate the supply of DC power to the light transmitting element 38. As another example, the LED 56 within the LED housing 50 could be replaced with a simple plug or socket which is seated within the LED housing 50. The plug or socket may then mate with a corresponding component attached to the end of the light transmitting element 38.

Referring briefly to FIG. 10, a pickup truck 100 is shown that incorporates the teachings of the vehicle article carrier system 10 in connection with a grab rail 102, a door handle molding 104 and a step bar 106. In this example each of the grab rail 102, door handle molding 104 and step bar 106 include one or more light transmitting components, such as light transmitting element 38, held within a channel such that light can be radiated outwardly from the channel to illuminate a limited area of the vehicle 100. It will also be appreciated that the light transmitting element 38 and the teachings related to the construction of the support rail 16 may also be applied to other vehicles such boats, personal watercraft, recreational vehicles, trailers, or any other form of vehicle where it is desired to light a limited portion of the vehicle.

Referring to FIG. 11, a rear step bumper portion 202 of a bumper 206 of a sport utility vehicle 200 may incorporate a light transmitting element 204 therein. The light transmitting element 204 provides a small degree of light that assists in illuminating the rear step bumper portion 202. The light transmitting element 204 may be controlled by a key FOB associated with the vehicle 200 or in concert with the vehicle's headlights, brake lights, daytime running lights, emergency flashers, etc.

Referring to FIGS. 12 and 13, an embodiment of a support rail 300 is shown that may be used with the vehicle article carrier system 10 of FIG. 1. In this embodiment the support rail 300 includes a solar panel cell 302 that is integrated into at least one of a pair of support feet 304 of the support rail 300. Optionally, a pair of the solar panel cells 302 may be integrated into both of the support feet 304 at the opposing ends of the support rail 300. The support rail 300 may also include a longitudinal portion that spans between the two support feet, and the support feet are adapted to be secured to the outer body surface 14 of the vehicle 12. A cross bar assembly 306 may be supported along an intermediate portion of the support rail 300 in a stowed position so as to not interfere with or cover the solar panel cell 302.

In FIG. 13 the construction of the solar panel cell 302 can be seen in greater detail. It will be appreciated immediately that the solar panel cell 302 could potentially be integrated into other areas of the support rail 300 provided direct exposure to solar radiation still is provided. Moreover, additional solar panel cells 302 could potentially be integrated onto a portion of the cross bar assembly 306 at its outermost ends if needed. However, it is anticipated that providing the solar panel cells 302 at least at two of the support feet 304 will be a highly preferred configuration.

The solar panel cell 302 may include a protective glass cover portion 310, a solar film layer 312 and an aluminum panel 314 for supporting the solar film layer 312. A battery 316 may be placed in electrical communication with the solar film layer 312 via suitable electrical conductors or contacts that make an electrical connection between the solar film layer 312 and the terminals of the battery 316. The battery 316, as well as at least a portion of the solar panel cell 302, is preferably mounted in a recess or pocket 318 of the support foot 304. Preferably the recess or pocket 318 is of sufficient depth and shape such that the solar panel cell 302 is substantially flush with an outer surface of the support foot 304, and appears as an integral, built-in portion of the support foot 304, when the support rail 300 is fully assembled. The battery 316 is also coupled to a light (not shown), such as LED 56 shown in the FIG. 6, that generates optical energy that is focused into one end of a fiber optic light component (not shown), such as light transmitting element 38 in FIG. 6 (e.g., fiber optic cable), to thus provide DC power to power the LED. Optionally, the solar panel cell 302 can be used with the battery 316 to provide DC power to an active lighting component such as an LED light strip as described herein. The solar panel cell 302 is further secured in a manner such that water cannot enter the pocket 318. In one implementation the solar panel cell 302 may be a lightweight, printed CIGS (Copper, Indium, Gallium, and Selenium) solar film available from Nanosolar of San Jose, Calif. However, it will be appreciated that other constructions of solar cells could be used as well. The application of battery power to the light transmitting element 38 (or any other type of light carried on the support rail 300) can be further controlled such that power from the battery 316 is applied when a user presses a "LOCK" or "UNLOCK" button on his/her key FOB. In this embodiment the battery may be coupled to the light transmitting element 38 by some form of switch that is controlled by a signal from a conductor (or conductors) that communicates with the vehicle's electronics.

It will also be appreciated that a conventional photocell could also be implemented in the support rail 300 to further control the power applied to the battery 316 in connection with the sensing of the ambient light level. The photocell would detect when the ambient lighting drops below a predetermined level and automatically switch on battery power to the light transmitting element 38. This could be desirable as a security feature because the photocell would detect when dusk occurs, and would then apply power from the battery 316 to the light transmitting element 38. The light transmitting element 38 would thus be illuminating the vehicle during the night time hours, even when the occupant is not driving the vehicle or present near the vehicle with his/her key FOB. As such, the light transmitting element 38 would be kept illuminated such as when the vehicle is left unattended in a shopping mall parking lot after dark. This could potentially deter vehicle theft or tampering with the vehicle.

In another implementation the support rail 300 may include a wireless receiver 320 that is also powered by the battery 316 and located in the pocket 318. The wireless receiver 320 could be responsive to a key FOB associated with the vehicle so that the light transmitting element 38 turns on for a predetermined duration whenever the user presses the "LOCK" or "UNLOCK" button on the key FOB. The wireless receiver 320 could also potentially be responsive to a wireless signal from the vehicle's electronics whenever the vehicle's ignition is turned to the "ON" position so that the light transmitting element 38 is illuminated, and powered by the battery 316, whenever the vehicle is running. In this embodiment it will be appreciated that the support rail 300 with its light transmitting element 38, battery 316, solar panel cell 302 and the wireless receiver 320 forms a fully independent and self-contained assembly that does not require any hardwired electrical connections or power from the vehicle's electrical system.

Referring briefly to FIG. 14, another embodiment of the support rail 300' is shown where an electronic assembly 320' having its own antenna is mounted in a support foot 304'. The electronic assembly 320' may be tailored to support satellite radio, GPS, auxiliary phone or radio operations. FIG. 14A illustrates a cover 350' that may be formed to cover the electronic assembly, and potentially form a hermetically sealed assembly.

Referring now to FIG. 15, another embodiment of a support rail 400 is shown where the support rail includes a pair of rear facing (relative to the vehicle) support feet 402 that each includes an integrated light 404 and a reflector 406. While only one support foot 402 is shown, it will be appreciated that both rear facing support feet 402 may include the integrated light 404 and the reflector 406. Optionally, the reflector 406 could instead be a light that is responsive to the application of the brake pedal of the vehicle. Such would obviously require wired or wireless communication between the vehicle's brake system components (and/or possibly the vehicle's onboard computer) and the light.

Referring now to FIG. 16, an embodiment of a support rail 500 is shown that has an enlarged, integrated reflector 504 built into its rear support foot 502. The reflector 504 can be included at each one of the support feet 502 of both support rails 500 of a vehicle article carrier.

Referring now to FIG. 17, an embodiment of a vehicle article carrier 600 is shown that includes a pair of support rails 602 and a pair of cross bars 604 that are stowable on the support rails 602 when the cross bars are not needed. Each support rail 602 includes a pair of support feet 606 at its opposite ends. Each support foot 606 includes a camera 608 that is able to image a predetermined range or swath of area adjacent to the vehicle. These ranges are indicated by reference numbers 612 in FIG. 18. From FIG. 18 it is apparent that the cameras 608 collectively provide coverage of a significant peripheral area around the vehicle. The cameras 608 may be used to provide images in electronic form to a transceiver 609a that is mounted either in the support rails 602 themselves or within the vehicle, as indicated by transceiver 609b. If a transceiver is mounted within the support feet 606 of the support rails 602, such as shown in FIG. 13 with receiver 320, then the transceiver may be powered by its own battery 316. In either event the transceiver 609 may transmit wireless images from each of the cameras to a user's cell phone (e.g., smartphone), as indicated by cell phone 614 shown in FIG. 19. A suitable application may be loaded into and stored on the user's cell phone 614 that allows the user to simply tap the screen 616, or to tap different arrows (not shown) presented on the screen, to toggle from one camera to another, and thus to view the image provided by each one of the cameras 608, as indicated for example at FIGS. 20 and 21. In this manner the user is able to quickly visualize virtually an entire peripheral area surrounding his/her vehicle as the user is approaching the vehicle, but still well before the user reaches and is standing close to the vehicle. It is also possible that the BLUETOOTH® wireless communications protocol could be used such that the user's cell phone receives a wireless signal from the vehicle's electronics and automatically begins running the camera application described above as soon as the user comes within a predetermined proximity of the vehicle (e.g., 30 feet) with his/her cell phone. It will be appreciated that the presentation of the video images provided by the cameras on the user's cell phone provides a significant security benefit to the user. An even further degree of security is provided if the cameras 608 are integrated in the support rails with a light transmitting element or other form of light component that automatically turns on either when the presence of the user's cell phone is sensed or when the user presses a button on his/her key FOB. With brief reference to FIG. 22, the images provided by the cameras 608 may also be fed to an in-dash display system 620 of the vehicle while the vehicle is moving so that the driver can be continuously comprised of the positions of other vehicles behind or adjacent his/her vehicle. This may significantly reduce and/or eliminate "blind spots" associated with the vehicle.

Referring to FIG. 23, a vehicle article carrier 700 is illustrated in accordance with another embodiment of the present disclosure. The vehicle article 700 is mounted on the outer body surface 14 of the vehicle 12 and includes a pair of support rails 702 each having a rear support foot portion 704 and a front foot support portion 706. In this example the front support foot portions 706 each include a LIDAR (Light Detection and Ranging) sensor 708, a conformal solar panel 710 shaped in accordance with the contour of the front support portion 706, and a battery 712. The two LIDAR sensors 708 each have a field of view that cooperatively enables the pair of sensors to have a field of view that encompasses not only at least portions of the sides of the vehicle 12, but also the front of the vehicle. Optionally, one or two additional LIDAR sensors could be mounted at or near the rear support foot portions 704 to provide a field of view of the rear and rear/side areas of the vehicle on which the vehicle article carrier 700 is mounted. In this manner a 360 degree view of the vehicle 12 could be provided by the LIDAR sensors 708.

The battery 712 is shown in dashed form being mounted within one of the front support foot portions 706, although the battery could be located essentially at any area of either of the support rails 702 or in one of the rear support foot portions 704. The battery 712 may be charged by the vehicle's 12 charging system while the vehicle is running, or from a starting battery 714 used to start the vehicle, or by using electrical energy produced by the solar panels 710, or a combination of these sources. If the solar panels 710 are used to provide the electrical charging for the battery 712, then they will act much like a battery tender. Suitable voltage monitoring circuitry (not shown) may be incorporated either in one of the support rails 702 or in the vehicle 12 itself, to detect when the battery 712 is fully charged. The battery 712 may provide power to enable the various electronic components and subsystems of the article carrier 700 to operate even when the vehicle 12 is not running or when a malfunction occurs with the charging system of the vehicle or the starting battery 714 is dead. The solar panels 710 could also be coupled to the vehicle's wiring harness (not shown) in a manner that allows a minimum amount of DC power to be provided to the vehicle's ECU (Engine Control Unit) in the event of a failure of the vehicle's charging system. This may help to power other subsystems of the vehicle (e.g., vehicle lights, power door locks, etc.) in the event that charging system and/or the starting battery 714 has malfunctioned. It is also possible that any of the sensors or electronic subsystems housed in the vehicle article carrier 700 may be connected to the vehicle's wiring harness in a manner that allows them to be powered strictly by the vehicle's charging system.

While the vehicle article carrier 700 is shown using LIDAR sensors 708, it will be appreciated that radar subsystems could instead be integrated into portions of the support rails 702, for example into the rear support feet portions 704 and/or the front support feet 706. The radar subsystem(s) could be used together with the LIDAR sensors 708 or in place of the LIDAR sensors.

Alternatively, the vehicle article carrier system 700 may include one or more infrared sensors 708a or one or more acoustic sensors 708b integrated into one or more portions of the vehicle article carrier. The infrared (IR) sensor(s) 708a could be used to gather information of a human or an animal rapidly approaching the vehicle 12 while it is moving or even stationary. The acoustic sensor 708b may be a sensor or antenna that is tuned to a specific frequency in the audible spectrum, for example the frequency of an emergency siren. In this manner the acoustic sensor 708b could be used to detect an approaching emergency vehicle that is not yet in view of the operator of the vehicle 12 while the operator is driving the vehicle. Regardless of whether LIDAR sensors 708, radar sensors, infrared sensors 708a or acoustic sensors 708b are used, the information obtained by these sensors could be transmitted to the vehicle's Engine Control Unit (ECU) for use by other on-board subsystems of the vehicle. For example, information obtained by LIDAR sensors 708 or radar subsystems may be used in connection with an Automated Driver Assist System ("ADAS") of the vehicle 12. The ability to locate LIDAR sensors or radar subsystems on the article carrier system 700 components provides a significant benefit because of the relatively unobstructed field of view that locations on the article carrier system provide.

FIG. 23 also shows a first integrated antenna 716 mounted in one of the support rails 706 and a second integrated antenna 718 mounted in the other one of the support rails 706. The first and second integrated antennas 716 and 718 may form one or more of an AM/FM antenna, a digital signal antenna for receiving an HD radio signal (e.g., XM Radio, Sirius Radio, etc.), or possibly an antenna for transmitting and receiving other analog signals such as those used by citizens band radios. Still further, one of the integrated antennas 716 or 718 may form a GPS antenna.

Referring further the vehicle article carrier system 700 of FIG. 23, one or more lighting systems 720 could be integrated into a portion of the system, for example into a portion of each of the side rails 702, or possibly even one or both cross bars 722 of the system. The lighting system(s) 720 may be LED lighting systems, incandescent lighting systems, a combination of both, or any other type of lighting system capable of being powered by power from the battery 712, by power from the starting battery 714 or from the vehicle's charging system. The lighting system(s) 720 may be permanently mounted in any portion of the article carrier system 700, such as in a stowed position shown in FIG. 23, or the system(s) 720 may be removably attached to permit removal by a user, or may even be mounted for articulation into two or more positions to best make use of the light it provides. For example, the lighting system 720 can be mounted to allow pivoting motion to allow it to be pulled out along arc 720a, to better illuminate a side portion of the vehicle (for example an area around one of the wheels of the vehicle). All of the foregoing lighting system implementations are envisioned for the vehicle article carrier system 700. The lighting system(s) 720 may also include a red or amber light to help alert other drivers when the vehicle 12 is braking. Still further, the lighting system(s) 720 could comprise turn signals, for example integrated into the rear support feet portions 704.

The various sensors, components or subsystems supported on the vehicle article carrier 700 may also be configured to be directly accessible using a short range, wireless communication protocol, for example the Bluetooth® communications protocol. In this event, it may be necessary to also locate a wireless communications module in the one or more components of the vehicle article carrier 700, for example in one of the support rails 702, one of the rear support portions 704 or one of the front support portions 704. In this manner a user may use her/his smartphone to communicate directly, wirelessly, with one or more electronic subsystems located on the vehicle article carrier system 700.

In some implementations the various sensors, antennas, lights or other electronic subsystems incorporated in the vehicle article carrier system 700 are in communication with, and under the control, of the vehicle's ECU. As such, information obtained by any sensor or electronic component forming a part of the system 700 may be provided to the vehicle's ECU in real time. Likewise, any commands from the ECU may be received and used by the sensors or other components integrated into the vehicle article carrier system 700 in real time.

With further reference to FIG. 23, the vehicle article carrier 700 may also incorporate an integrated wireless router or wireless repeater 724. The wireless router or repeater 724 may be in communication with an electronic subsystem of the vehicle, for example the vehicle's infotainment/radio system. The wireless router or repeater 724 may enhance the ability of personal electronic devices of users present in the vehicle 12 to wirelessly access a free remote WiFi hotspot, such in a coffee shop or restaurant, while still remaining in the vehicle 12.

It will be appreciated that all of the sensors and subsystems described in connection with the various embodiments may be either integrated into, or possibly removably mounted on, one of the components of the vehicle article carrier 700. Accordingly, the various sensors and subsystems described above should not be interpreted as being limited strictly to a permanently mounted configuration on the vehicle article carrier system 700, or to a removable configuration; both implementations are within the present disclosure.

Example embodiments have been provided herein so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A vehicle article carrier system for carrying articles above an outer body surface of a vehicle, the system comprising:
    at least one support rail secured to the outer body surface, the at least one support rail including:
        a support foot portion at each of its opposite ends, each said support foot portion being adapted to be secured to the outer body surface of the vehicle;
        a sensor mounted on at least one of the at least one support rail or one of the support foot portions for sensing a characteristic within a field of view around the vehicle and providing related information to a subsystem of the vehicle.

2. The system of claim 1, further comprising a solar panel supported on the at least one support rail or on at least one of the support foot portions.

3. The system of claim 1, further comprising a battery mounted on at least one of the support rail or one of the support foot portions, and configured to be charged by the energy provided by a solar panel.

4. The system of claim 3, wherein the battery provides power to the sensor.

5. The system of claim 1, further comprising a light supported on the vehicle article carrier.

6. The system of claim 5, wherein the light is articulated into a stowed position and a position extending outwardly from the vehicle article carrier.

7. The system of claim 1, wherein the sensor comprises at least one of:
    a light detection and ranging (LIDAR) sensor;
    a radar sensing system;
    an acoustic sensor; or
    an infrared (IR) sensor.

8. The system of claim 1, wherein the vehicle article carrier further includes a wireless router in communication with at least one of an electronic subsystem of the vehicle or a personal electronic device present within or adjacent to the vehicle.

9. The system claim 3, wherein the battery is integrated into one of the support foot portions or the at least one support rail.

10. The system of claim 1, further comprising an integrated antenna mounted on the vehicle article carrier system.

11. The system of claim 10, wherein the integrated antenna comprises at least one of:
    an AM/FM antenna; or
    a HD radio antenna.

12. A vehicle article carrier system for carrying articles above an outer body surface of a vehicle, the system comprising:
    a pair of support rails secured to the outer body surface, each of the support rails including a support foot portion at each of its opposite ends, each said support foot portion being adapted to be secured to the outer body surface of the vehicle;
    a sensor mounted on at least one of the support rails or one of the support foot portions for sensing a characteristic within a predetermined field of view around the vehicle and providing information to a subsystem of the vehicle; and a battery supported on at least one of the support rails or one of support feet portions, for powering the sensor.

13. The system of claim 12, wherein the sensor comprises at least one of:
   a light detection and ranging (LIDAR) sensor;
   a radar sensing system;
   an acoustic sensor; or
   an infrared (IR) sensor.

14. The system of claim 12, further comprising a camera integrated into at least one of:
   the support foot portions; or
   the support rails.

15. The system of claim 12, further comprising a light integrated into at least one of:
   the support foot portions; or
   the support rails.

16. The system of claim 12, further comprising an antenna integrated into at least one of:
   the support foot portions; or
   the support rails.

17. The vehicle article carrier of claim 12, further comprising at least one of a router or a wireless repeater integrated into at least one of:
   the support foot portions; or
   the support rails.

18. A vehicle article carrier system for carrying articles above an outer body surface of a vehicle, the system comprising:
   a pair of support rails secured to the outer body surface, each said support rail including a front support foot portion and a rear support foot portion at opposite ends thereof, each of said front and rear support feet portions adapted to be secured to the outer body surface of the vehicle;
   a sensor mounted on at least one of the support rails or one of the support foot portions for sensing a characteristic within a field of view around the vehicle and providing information to an electronic subsystem of the vehicle;
   a light integrated into at least one of the support rails, or one of the support foot portions;
   a battery integrated into at least one of the support rails, or one of the support foot portions, for powering the sensor and the light; and
   wherein the light and the sensor are in communication with an electronic control unit (ECU) of the vehicle and under the control of the ECU.

19. The system of claim 18, wherein the sensor comprises at least one of:
   a light detection and ranging (LIDAR) sensor;
   a radar sensing system;
   an acoustic sensor; or
   an infrared (IR) sensor.

20. The system of claim 18, further comprising a camera integrated into the vehicle article carrier system for imaging a field of view around a portion of the vehicle.

* * * * *